(12) United States Patent
Gupta et al.

(10) Patent No.: US 11,888,599 B2
(45) Date of Patent: *Jan. 30, 2024

(54) SCALABLE LEADERSHIP ELECTION IN A MULTI-PROCESSING COMPUTING ENVIRONMENT

(71) Applicant: Nutanix, Inc., San Jose, CA (US)

(72) Inventors: Karan Gupta, San Jose, CA (US);
Pavan Kumar Konka, Milpitas, CA (US); Parthasarathy Ramachandran, Palo Alto, CA (US); Arun Olappamanna Vasudevan, Kirkland, WA (US); Andrey Alexseyevich Pyatkov, Seattle, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,480

(22) Filed: Dec. 29, 2021

(65) Prior Publication Data
US 2022/0239602 A1     Jul. 28, 2022

Related U.S. Application Data

(63) Continuation of application No. 15/160,347, filed on May 20, 2016, now Pat. No. 11,218,418.

(51) Int. Cl.
*H04L 47/70* (2022.01)
*H04L 67/10* (2022.01)
*H04L 67/01* (2022.01)

(52) U.S. Cl.
CPC .............. *H04L 47/70* (2013.01); *H04L 67/01* (2022.05); *H04L 67/10* (2013.01)

(58) Field of Classification Search
CPC ......... H04L 47/70; H04L 67/01; H04L 67/10; H04L 69/40
See application file for complete search history.

(56) References Cited

U.S. PATENT DOCUMENTS

| 5,253,252 A | 10/1993 | Tobol |
| 5,276,867 A | 1/1994 | Kenley et al. |

(Continued)

FOREIGN PATENT DOCUMENTS

| CN | 103746997 | 4/2014 |
| CN | 105100210 | 11/2015 |

(Continued)

OTHER PUBLICATIONS

US 11,048,595 B2, 06/2021, Venkatesh et al. (withdrawn)

(Continued)

*Primary Examiner* — Anh Nguyen
*Assistant Examiner* — Tesfu N Mekonen
(74) *Attorney, Agent, or Firm* — Vista IP Law Group, LLP

(57) ABSTRACT

A scalable multi-cluster resource sharing facility. A global witness process runs on a first computing platform that communicates over one or more networks to any number of nodes situated over two or more clusters. The global witness process listens on the network for occurrences of leadership and/or resource requests from nodes of different clusters. The global witness processes a request by retrieving a resource request and a respective last known state value, comparing the last known state value to a global stored state value, then storing a new state value when the respective last known state value is equal to the stored state value. Any number of contemporaneous requests can be processed by the global witness process, however only one request can be granted. The other requestors each receive a rejection of their resource request when their proffered last known state value is not equal to the stored state value.

24 Claims, 16 Drawing Sheets

(56) References Cited

U.S. PATENT DOCUMENTS

| | | | |
|---|---|---|---|
| 5,664,144 A | 9/1997 | Yanai et al. | |
| 5,870,555 A | 2/1999 | Pruett et al. | |
| 5,873,085 A | 2/1999 | Enoki | |
| 5,884,308 A | 3/1999 | Foulston | |
| 5,924,096 A | 7/1999 | Draper | |
| 6,055,543 A | 4/2000 | Christensen et al. | |
| 6,085,234 A | 7/2000 | Pitts et al. | |
| 6,101,508 A | 8/2000 | Wolff | |
| 6,212,531 B1 | 4/2001 | Blea et al. | |
| 6,289,356 B1 | 9/2001 | Hitz et al. | |
| 6,341,340 B1 | 1/2002 | Tsukerman et al. | |
| 6,363,416 B1 | 3/2002 | Naeimi et al. | |
| 6,442,602 B1 | 8/2002 | Choudhry | |
| 6,539,381 B1 | 3/2003 | Prasad | |
| 6,684,397 B1 | 1/2004 | Byer et al. | |
| 6,738,801 B1 | 5/2004 | Kawaguchi et al. | |
| 6,928,589 B1 | 8/2005 | Pomaranski et al. | |
| 6,963,914 B1 | 11/2005 | Breitbart et al. | |
| 6,968,345 B1 | 11/2005 | Muhlestein | |
| 7,120,631 B1 | 10/2006 | Vahalia et al. | |
| 7,159,056 B2 | 1/2007 | Goldick | |
| 7,162,467 B2 | 1/2007 | Eshleman | |
| 7,356,679 B1 | 4/2008 | Le et al. | |
| 7,366,738 B2 | 4/2008 | Yorke | |
| 7,379,419 B2 | 5/2008 | Collins | |
| 7,409,511 B2 | 8/2008 | Edwards et al. | |
| 7,421,578 B1 | 9/2008 | Huang et al. | |
| 7,461,374 B1 | 12/2008 | Balint et al. | |
| 7,606,868 B1 | 10/2009 | Le et al. | |
| 7,647,427 B1 | 1/2010 | Devarapalli | |
| 7,702,843 B1 | 4/2010 | Chen et al. | |
| 7,707,618 B1 | 4/2010 | Cox | |
| 7,720,864 B1 | 5/2010 | Muth et al. | |
| 7,725,671 B2 | 5/2010 | Prahlad et al. | |
| 7,752,492 B1 | 7/2010 | Armangau et al. | |
| 7,774,391 B1 | 8/2010 | Le et al. | |
| 7,805,469 B1 | 9/2010 | Nagaralu et al. | |
| 7,805,511 B1 | 9/2010 | Panicker et al. | |
| 7,840,533 B2 | 11/2010 | Prahlad et al. | |
| 7,890,529 B1 | 2/2011 | Srinivasan et al. | |
| 7,934,117 B2 | 4/2011 | Kakivaya et al. | |
| 7,937,453 B1 | 5/2011 | Hayden et al. | |
| 7,937,455 B2 | 5/2011 | Saha et al. | |
| 7,941,470 B2 | 5/2011 | Le et al. | |
| 7,990,962 B2 | 8/2011 | Chang et al. | |
| 8,051,252 B2 | 11/2011 | Williams | |
| 8,051,262 B2 | 11/2011 | Ichikawa et al. | |
| 8,095,810 B2 | 1/2012 | Matsuzawa et al. | |
| 8,095,931 B1 | 1/2012 | Chen et al. | |
| 8,190,588 B1 | 5/2012 | Gupta et al. | |
| 8,219,769 B1 | 7/2012 | Wilk | |
| 8,352,482 B2 | 1/2013 | Hansen | |
| 8,352,608 B1 | 1/2013 | Keagy et al. | |
| 8,359,594 B1 | 1/2013 | Davidson | |
| 8,365,167 B2 | 1/2013 | Beaty et al. | |
| 8,392,680 B1 | 3/2013 | Natanzon et al. | |
| 8,407,448 B1 | 3/2013 | Hayden et al. | |
| 8,424,003 B2 | 4/2013 | Degenaro et al. | |
| 8,447,728 B2 | 5/2013 | Prahlad et al. | |
| 8,473,462 B1 | 6/2013 | Banerjee | |
| 8,473,775 B1 | 6/2013 | Helmick | |
| 8,484,163 B1 | 7/2013 | Yucel et al. | |
| 8,484,356 B1 | 7/2013 | Douglis et al. | |
| 8,539,076 B2 | 9/2013 | Nakano et al. | |
| 8,543,790 B2 | 9/2013 | Chen et al. | |
| 8,549,518 B1 | 10/2013 | Aron | |
| 8,601,471 B2 | 12/2013 | Beaty | |
| 8,601,473 B1 | 12/2013 | Aron et al. | |
| 8,635,351 B2 | 1/2014 | Astete et al. | |
| 8,646,089 B2 | 2/2014 | Jayanthi et al. | |
| 8,655,851 B2 * | 2/2014 | Patwardhan | G06F 16/119 707/674 |
| 8,688,660 B1 | 4/2014 | Sivasubramanian et al. | |
| 8,725,679 B2 | 5/2014 | Nair | |
| 8,751,515 B1 | 6/2014 | Xing et al. | |
| 8,762,335 B2 | 6/2014 | Prahlad et al. | |
| 8,805,951 B1 | 8/2014 | Faibish et al. | |
| 8,838,923 B2 | 9/2014 | Prahlad et al. | |
| 8,850,130 B1 | 9/2014 | Aron et al. | |
| 8,863,124 B1 | 10/2014 | Aron | |
| 8,898,668 B1 | 11/2014 | Costea | |
| 8,914,429 B2 | 12/2014 | Pitts | |
| 8,935,563 B1 | 1/2015 | Rajaa et al. | |
| 8,949,557 B2 | 2/2015 | Kamei et al. | |
| 8,966,188 B1 | 2/2015 | Bardale | |
| 8,983,952 B1 | 3/2015 | Zhang et al. | |
| 8,996,783 B2 | 3/2015 | Huang et al. | |
| 9,009,106 B1 | 4/2015 | Aron et al. | |
| 9,032,248 B1 | 5/2015 | Petty | |
| 9,043,567 B1 | 5/2015 | Modukuri et al. | |
| 9,060,014 B2 | 6/2015 | Crowley | |
| 9,069,708 B2 | 6/2015 | Gill et al. | |
| 9,152,628 B1 | 10/2015 | Stacey et al. | |
| 9,154,535 B1 | 10/2015 | Harris | |
| 9,165,003 B1 | 10/2015 | Tummala | |
| 9,201,698 B2 | 12/2015 | Ashok et al. | |
| 9,201,704 B2 | 12/2015 | Chang et al. | |
| 9,201,887 B1 | 12/2015 | Earl et al. | |
| 9,213,513 B2 | 12/2015 | Hartz et al. | |
| 9,244,674 B2 | 1/2016 | Waterman et al. | |
| 9,244,969 B1 | 1/2016 | Love et al. | |
| 9,256,475 B1 | 2/2016 | Aron et al. | |
| 9,256,612 B1 | 2/2016 | Bhatt et al. | |
| 9,268,586 B2 | 2/2016 | Voccio et al. | |
| 9,274,817 B1 | 3/2016 | Fan et al. | |
| 9,286,298 B1 | 3/2016 | Gillett, Jr. | |
| 9,286,344 B1 | 3/2016 | Bhardwaj et al. | |
| 9,292,327 B1 | 3/2016 | Von Thenen et al. | |
| 9,336,132 B1 | 5/2016 | Aron et al. | |
| 9,348,702 B2 | 5/2016 | Hsu et al. | |
| 9,389,887 B1 | 7/2016 | Aron et al. | |
| 9,405,566 B2 | 8/2016 | Chawla et al. | |
| 9,411,628 B2 | 8/2016 | Bezbaruah et al. | |
| 9,448,887 B1 | 9/2016 | Ben Dayan et al. | |
| 9,497,257 B1 | 11/2016 | Love et al. | |
| 9,513,946 B2 | 12/2016 | Sevigny et al. | |
| 9,519,596 B2 | 12/2016 | Coppola et al. | |
| 9,535,907 B1 | 1/2017 | Stringham | |
| 9,563,555 B2 | 2/2017 | Flynn et al. | |
| 9,571,561 B2 | 2/2017 | Jang | |
| 9,590,843 B2 | 3/2017 | Cui et al. | |
| 9,619,257 B1 | 4/2017 | Aron et al. | |
| 9,634,990 B2 | 4/2017 | Lee | |
| 9,639,428 B1 | 5/2017 | Boda | |
| 9,639,588 B2 | 5/2017 | Cheng | |
| 9,652,265 B1 | 5/2017 | Narayanasamy et al. | |
| 9,658,899 B2 | 5/2017 | Jenkins | |
| 9,690,670 B1 | 6/2017 | Paulzagade et al. | |
| 9,733,958 B2 | 8/2017 | Cui | |
| 9,740,436 B2 | 8/2017 | Fiebrich-kandler et al. | |
| 9,740,472 B1 | 8/2017 | Sohi | |
| 9,740,723 B2 | 8/2017 | Prahlad et al. | |
| 9,747,287 B1 | 8/2017 | Bhardwaj et al. | |
| 9,772,284 B2 | 9/2017 | Quan et al. | |
| 9,772,866 B1 | 9/2017 | Aron et al. | |
| 9,779,015 B1 | 10/2017 | Oikarinen et al. | |
| 9,817,703 B1 * | 11/2017 | Ryland | G06F 9/52 |
| 9,832,136 B1 | 11/2017 | Gibson | |
| 9,846,706 B1 | 12/2017 | Basov et al. | |
| 9,853,978 B2 | 12/2017 | Tellvik et al. | |
| 9,870,291 B2 | 1/2018 | Bezbaruah et al. | |
| 9,893,988 B2 | 2/2018 | Agarwal et al. | |
| 9,898,522 B2 | 2/2018 | Cole et al. | |
| 9,940,154 B2 | 4/2018 | Ramani et al. | |
| 9,946,573 B2 | 4/2018 | Mcdermott | |
| 10,009,215 B1 | 6/2018 | Shorey | |
| 10,050,862 B2 | 8/2018 | Nambiar et al. | |
| 10,083,022 B2 | 9/2018 | Fukui et al. | |
| 10,084,873 B2 | 9/2018 | Dornemann | |
| 10,095,506 B2 | 10/2018 | Gopalapura Venkatesh et al. | |
| 10,101,989 B2 | 10/2018 | Sinha et al. | |
| 10,114,706 B1 | 10/2018 | Chougala et al. | |
| 10,127,059 B2 | 11/2018 | Astete et al. | |
| 10,140,115 B2 | 11/2018 | Fukui et al. | |

(56) References Cited

U.S. PATENT DOCUMENTS

| | | | |
|---|---|---|---|
| 10,152,233 B2 | 12/2018 | Xu et al. | |
| 10,210,048 B2 | 2/2019 | Sancheti | |
| 10,210,172 B1 | 2/2019 | Konig et al. | |
| 10,248,657 B2 | 4/2019 | Prahlad et al. | |
| 10,311,153 B2 | 6/2019 | Mason | |
| 10,362,092 B1 | 7/2019 | Parthasarathy | |
| 10,367,753 B2 | 7/2019 | Schultze et al. | |
| 10,379,759 B2 | 8/2019 | Bhardwaj et al. | |
| 10,394,547 B2 | 8/2019 | Fukui et al. | |
| 10,419,426 B2 | 9/2019 | Bakshan et al. | |
| 10,523,592 B2 | 12/2019 | Byers et al. | |
| 10,530,742 B2 | 1/2020 | Shah et al. | |
| 10,534,634 B2 | 1/2020 | Yang et al. | |
| 10,540,164 B2 | 1/2020 | Bafna et al. | |
| 10,540,165 B2 | 1/2020 | Bafna et al. | |
| 10,540,166 B2 | 1/2020 | Arikatla et al. | |
| 10,542,049 B2 | 1/2020 | Cui et al. | |
| 10,594,730 B1 | 3/2020 | Summers | |
| 10,599,459 B2 | 3/2020 | Livshits | |
| 10,642,507 B2 | 5/2020 | Gupta et al. | |
| 10,642,518 B1 | 5/2020 | Bezbaruah et al. | |
| 10,719,305 B2 | 7/2020 | Sinha et al. | |
| 10,719,306 B2 | 7/2020 | Deshmukh et al. | |
| 10,719,307 B2 | 7/2020 | Kanada et al. | |
| 10,728,090 B2 | 7/2020 | Deshmukh et al. | |
| 10,728,255 B2 | 7/2020 | Jindal et al. | |
| 10,809,998 B2 | 10/2020 | Gopalapura Venkatesh et al. | |
| 10,824,455 B2 | 11/2020 | Arikatla et al. | |
| 10,831,465 B2 | 11/2020 | Sharpe et al. | |
| 10,838,708 B2 | 11/2020 | Sinha et al. | |
| 10,949,192 B2 | 3/2021 | Gopalapura Venkatesh | |
| 10,963,182 B2 | 3/2021 | Blau et al. | |
| 11,025,626 B1 | 6/2021 | Todd | |
| 11,086,826 B2 | 8/2021 | Thummala | |
| 11,106,447 B2 | 8/2021 | Gupta | |
| 11,194,680 B2 | 12/2021 | Konka et al. | |
| 11,218,418 B2 | 1/2022 | Gupta et al. | |
| 11,281,484 B2 | 3/2022 | Bafna et al. | |
| 11,288,239 B2 | 3/2022 | Bafna et al. | |
| 11,294,777 B2 | 4/2022 | Venkatesh et al. | |
| 11,310,286 B2 | 4/2022 | Cui et al. | |
| 2001/0047400 A1 | 11/2001 | Coates | |
| 2002/0069196 A1 | 6/2002 | Betros | |
| 2002/0120763 A1 | 8/2002 | Miloushev et al. | |
| 2002/0133491 A1 | 9/2002 | Sim et al. | |
| 2003/0014442 A1 | 1/2003 | Shiigi | |
| 2003/0115218 A1 | 6/2003 | Bobbitt et al. | |
| 2003/0163597 A1 | 8/2003 | Hellman et al. | |
| 2003/0195942 A1 | 10/2003 | Muhlestein et al. | |
| 2004/0054777 A1 | 3/2004 | Ackaouy et al. | |
| 2004/0199734 A1 | 10/2004 | Rajamani | |
| 2004/0210591 A1 | 10/2004 | Hirschfeld et al. | |
| 2004/0225742 A1 | 11/2004 | Loaiza | |
| 2004/0267832 A1 | 12/2004 | Wong et al. | |
| 2005/0094574 A1 | 5/2005 | Han et al. | |
| 2005/0120160 A1 | 6/2005 | Plouffe et al. | |
| 2005/0120180 A1 | 6/2005 | Schornbach et al. | |
| 2005/0125503 A1 | 6/2005 | Iyengar et al. | |
| 2005/0193221 A1 | 9/2005 | Yoneyama | |
| 2005/0193245 A1 | 9/2005 | Hayden et al. | |
| 2005/0201272 A1 | 9/2005 | Wang et al. | |
| 2005/0210461 A1 | 9/2005 | Srivastava et al. | |
| 2005/0226059 A1 | 10/2005 | Kavuri et al. | |
| 2005/0228798 A1 | 10/2005 | Shepard et al. | |
| 2005/0268298 A1 | 12/2005 | Hunt et al. | |
| 2006/0010227 A1 | 1/2006 | Atluri | |
| 2006/0047685 A1 | 3/2006 | Dearing et al. | |
| 2006/0069912 A1 | 3/2006 | Zheng et al. | |
| 2006/0080445 A1 | 4/2006 | Chang | |
| 2006/0080657 A1 | 4/2006 | Goodman | |
| 2006/0136781 A1 | 6/2006 | Lamport | |
| 2006/0167921 A1 | 7/2006 | Grebus | |
| 2006/0206901 A1 | 9/2006 | Chan | |
| 2006/0224918 A1 | 10/2006 | Koike | |
| 2006/0225065 A1 | 10/2006 | Chandhok et al. | |
| 2006/0271510 A1 | 11/2006 | Harward | |
| 2006/0271931 A1 | 11/2006 | Harris | |
| 2007/0022129 A1 | 1/2007 | Bahar et al. | |
| 2007/0038913 A1 | 2/2007 | Allen et al. | |
| 2007/0100905 A1 | 5/2007 | Masters et al. | |
| 2007/0171921 A1 | 7/2007 | Wookey et al. | |
| 2007/0179995 A1 | 8/2007 | Prahlad | |
| 2007/0271561 A1 | 11/2007 | Winner et al. | |
| 2007/0300220 A1 | 12/2007 | Seliger et al. | |
| 2008/0040483 A1 | 2/2008 | Nakatani | |
| 2008/0071997 A1 | 3/2008 | Loaiza | |
| 2008/0098194 A1 | 4/2008 | Hashimoto et al. | |
| 2008/0104349 A1 | 5/2008 | Maruyama | |
| 2008/0104589 A1 | 5/2008 | Mccrory et al. | |
| 2008/0133486 A1 | 6/2008 | Fitzgerald et al. | |
| 2008/0134178 A1 | 6/2008 | Fitzgerald et al. | |
| 2008/0189468 A1 | 8/2008 | Schmidt et al. | |
| 2008/0201414 A1 | 8/2008 | Amir et al. | |
| 2008/0201457 A1 | 8/2008 | London | |
| 2008/0208938 A1 | 8/2008 | Lin et al. | |
| 2008/0263113 A1 | 10/2008 | Krishnaiyer | |
| 2008/0270677 A1 | 10/2008 | Kolakowski | |
| 2008/0320499 A1 | 12/2008 | Suit | |
| 2008/0320583 A1 | 12/2008 | Sharma et al. | |
| 2009/0006801 A1 | 1/2009 | Shultz et al. | |
| 2009/0100248 A1 | 4/2009 | Kami | |
| 2009/0113034 A1 | 4/2009 | Krishnappa et al. | |
| 2009/0144720 A1 | 6/2009 | Roush et al. | |
| 2009/0150885 A1 | 6/2009 | Safari | |
| 2009/0158082 A1 | 6/2009 | Jain et al. | |
| 2009/0171971 A1 | 7/2009 | Goddard et al. | |
| 2009/0193272 A1 | 7/2009 | Matsuzawa et al. | |
| 2009/0216975 A1 | 8/2009 | Halperin et al. | |
| 2009/0248870 A1 | 10/2009 | Kamei et al. | |
| 2009/0249470 A1 | 10/2009 | Litvin et al. | |
| 2009/0254572 A1 | 10/2009 | Redlich | |
| 2009/0271412 A1 | 10/2009 | Lacapra et al. | |
| 2009/0287887 A1 | 11/2009 | Matsuki et al. | |
| 2009/0288084 A1 | 11/2009 | Astete et al. | |
| 2009/0290572 A1 | 11/2009 | Gonia et al. | |
| 2010/0023521 A1 | 1/2010 | Arcese | |
| 2010/0042869 A1 | 2/2010 | Szabo et al. | |
| 2010/0070725 A1 | 3/2010 | Prahlad et al. | |
| 2010/0082716 A1 | 4/2010 | Agetsuma et al. | |
| 2010/0082774 A1 | 4/2010 | Pitts | |
| 2010/0095289 A1 | 4/2010 | Nguyen et al. | |
| 2010/0050944 A1 | 5/2010 | Callahan | |
| 2010/0110150 A1 | 5/2010 | Xu et al. | |
| 2010/0138921 A1 | 6/2010 | Na et al. | |
| 2010/0162226 A1 | 6/2010 | Borissov et al. | |
| 2010/0174745 A1 | 7/2010 | Ryan et al. | |
| 2010/0214908 A1 | 8/2010 | Ralev | |
| 2010/0241785 A1 | 9/2010 | Chen et al. | |
| 2010/0250824 A1 | 9/2010 | Belay | |
| 2010/0262717 A1 | 10/2010 | Critchley | |
| 2010/0275205 A1 | 10/2010 | Nakajima | |
| 2010/0306256 A1 | 12/2010 | Blackman | |
| 2011/0022694 A1 | 1/2011 | Dalal et al. | |
| 2011/0022695 A1 | 1/2011 | Dalal et al. | |
| 2011/0022812 A1 | 1/2011 | van der Linden et al. | |
| 2011/0022883 A1 | 1/2011 | Hansen | |
| 2011/0047340 A1 | 2/2011 | Olson et al. | |
| 2011/0078318 A1 | 3/2011 | Desai et al. | |
| 2011/0107135 A1 | 5/2011 | Andrews et al. | |
| 2011/0119668 A1 | 5/2011 | Calder | |
| 2011/0119763 A1 | 5/2011 | Wade et al. | |
| 2011/0125835 A1 | 5/2011 | Soltis | |
| 2011/0137879 A1 | 6/2011 | Dubey | |
| 2011/0145627 A1* | 6/2011 | Huras | G06F 9/526 718/104 |
| 2011/0161299 A1 | 6/2011 | Prahlad et al. | |
| 2011/0173493 A1 | 7/2011 | Armstrong et al. | |
| 2011/0179414 A1 | 7/2011 | Goggin et al. | |
| 2011/0184993 A1 | 7/2011 | Chawla | |
| 2011/0185292 A1 | 7/2011 | Chawla et al. | |
| 2011/0225574 A1 | 9/2011 | Khalidi et al. | |
| 2011/0239213 A1 | 9/2011 | Aswani et al. | |
| 2011/0251992 A1 | 10/2011 | Bethlehem | |
| 2011/0252208 A1 | 10/2011 | Ali et al. | |

(56) References Cited

U.S. PATENT DOCUMENTS

| | | |
|---|---|---|
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0078948 A1 | 3/2012 | Darcy |
| 2012/0081395 A1 | 4/2012 | Adi et al. |
| 2012/0084381 A1 | 4/2012 | Alladi et al. |
| 2012/0117555 A1 | 5/2012 | Banerjee et al. |
| 2012/0166866 A1 | 6/2012 | Rao et al. |
| 2012/0209983 A1 | 8/2012 | Bronner |
| 2012/0222089 A1 | 8/2012 | Whelan et al. |
| 2012/0126177 A1 | 9/2012 | Wang |
| 2012/0233463 A1 | 9/2012 | Holt et al. |
| 2012/0233608 A1 | 9/2012 | Toeroe |
| 2012/0243795 A1 | 9/2012 | Head et al. |
| 2012/0254342 A1 | 10/2012 | Evans |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0266231 A1 | 10/2012 | Spiers et al. |
| 2012/0272237 A1 | 10/2012 | Baron |
| 2012/0290630 A1 | 11/2012 | Aizman et al. |
| 2012/0304247 A1 | 11/2012 | Badger |
| 2012/0310881 A1 | 12/2012 | Shadmon |
| 2012/0310892 A1 | 12/2012 | Dam et al. |
| 2012/0317142 A1 | 12/2012 | Broecheler et al. |
| 2012/0324183 A1 | 12/2012 | Chiruvolu et al. |
| 2013/0007741 A1 | 1/2013 | Britsch et al. |
| 2013/0036323 A1 | 2/2013 | Goose et al. |
| 2013/0046740 A1 | 2/2013 | Li et al. |
| 2013/0047160 A1 | 2/2013 | Conover |
| 2013/0054973 A1 | 2/2013 | Fok et al. |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0138995 A1 | 5/2013 | Sivaramakrishnan et al. |
| 2013/0151888 A1 | 6/2013 | Bhattiprolu et al. |
| 2013/0152077 A1 | 6/2013 | Leitman et al. |
| 2013/0152085 A1 | 6/2013 | D'Amore et al. |
| 2013/0174246 A1 | 7/2013 | Schrecker et al. |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0219030 A1 | 8/2013 | Szabo |
| 2013/0227379 A1 | 8/2013 | Gupta et al. |
| 2013/0227550 A1 | 8/2013 | Weinstein et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0235774 A1 | 9/2013 | Jo et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2013/0304694 A1 | 11/2013 | Barreto et al. |
| 2013/0332771 A1 | 12/2013 | Salapura et al. |
| 2014/0006708 A1 | 1/2014 | Huynh et al. |
| 2014/0025796 A1 | 1/2014 | Vibhor et al. |
| 2014/0052877 A1 | 2/2014 | Mao |
| 2014/0059392 A1 | 2/2014 | Ren et al. |
| 2014/0068612 A1 | 3/2014 | Torrey |
| 2014/0068711 A1 | 3/2014 | Schweitzer, III et al. |
| 2014/0075029 A1 | 3/2014 | Lipchuk et al. |
| 2014/0089259 A1 | 3/2014 | Cheng |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0101649 A1 | 4/2014 | Kamble |
| 2014/0108587 A1 | 4/2014 | Goldberg |
| 2014/0109172 A1 | 4/2014 | Barton et al. |
| 2014/0115182 A1 | 4/2014 | Sabaa et al. |
| 2014/0123138 A1 | 5/2014 | Lee et al. |
| 2014/0143831 A1 | 5/2014 | Fieweger |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0164831 A1 | 6/2014 | Merriman et al. |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189429 A1 | 7/2014 | Gill |
| 2014/0189677 A1 | 7/2014 | Curzi |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0222953 A1 | 8/2014 | Karve et al. |
| 2014/0230024 A1 | 8/2014 | Uehara et al. |
| 2014/0237464 A1 | 8/2014 | Waterman et al. |
| 2014/0245387 A1* | 8/2014 | Colpo ............... G06F 9/526 726/3 |
| 2014/0250300 A1 | 9/2014 | Runkis et al. |
| 2014/0279909 A1 | 9/2014 | Sudarsanam et al. |
| 2014/0298185 A1 | 10/2014 | Chen |
| 2014/0310710 A1 | 10/2014 | Lubsey et al. |
| 2014/0359612 A1 | 12/2014 | D'Amato et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032653 A1 | 1/2015 | Iyer et al. |
| 2015/0032690 A1 | 1/2015 | Hoque et al. |
| 2015/0039735 A1 | 2/2015 | Zeyliger |
| 2015/0039763 A1 | 2/2015 | Chaudhary et al. |
| 2015/0039837 A1 | 2/2015 | Quan et al. |
| 2015/0058298 A1 | 2/2015 | Earl et al. |
| 2015/0081644 A1 | 3/2015 | Pitts |
| 2015/0095788 A1 | 4/2015 | Thiele et al. |
| 2015/0106325 A1 | 4/2015 | Cole et al. |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0143164 A1 | 5/2015 | Veerla |
| 2015/0172412 A1 | 6/2015 | Escriva |
| 2015/0178019 A1 | 6/2015 | Hegdal et al. |
| 2015/0205618 A1 | 7/2015 | Bailey et al. |
| 2015/0205639 A1 | 7/2015 | Matsumoto et al. |
| 2015/0213032 A1 | 7/2015 | Powell et al. |
| 2015/0220324 A1 | 8/2015 | Arcese et al. |
| 2015/0242291 A1 | 8/2015 | Chang et al. |
| 2015/0244802 A1 | 8/2015 | Simoncelli |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0347775 A1 | 12/2015 | Bie et al. |
| 2015/0355862 A1 | 12/2015 | Hayes |
| 2015/0378761 A1 | 12/2015 | Sevigny |
| 2015/0378853 A1 | 12/2015 | Sevigny |
| 2016/0011898 A1 | 1/2016 | Lee |
| 2016/0018446 A1 | 2/2016 | Bondurant |
| 2016/0034555 A1 | 2/2016 | Rahut et al. |
| 2016/0050118 A1 | 2/2016 | Blanco et al. |
| 2016/0057009 A1 | 2/2016 | Kadayam et al. |
| 2016/0070492 A1 | 3/2016 | Cherubini et al. |
| 2016/0077936 A1 | 3/2016 | Tang et al. |
| 2016/0077988 A1 | 3/2016 | Tipton |
| 2016/0078068 A1 | 3/2016 | Agrawal et al. |

(56) References Cited

U.S. PATENT DOCUMENTS

| | | |
|---|---|---|
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179416 A1 | 6/2016 | Mutha |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0204977 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy |
| 2016/0301766 A1 | 10/2016 | Ionescu et al. |
| 2016/0316003 A1 | 10/2016 | Snider |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0359955 A1 | 12/2016 | Gill et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0094002 A1 | 3/2017 | Kumar et al. |
| 2017/0109184 A1 | 4/2017 | Ramani et al. |
| 2017/0160983 A1 | 6/2017 | Fiske et al. |
| 2017/0177638 A1 | 6/2017 | Bhosale et al. |
| 2017/0193021 A1 | 7/2017 | Deng |
| 2017/0206074 A1 | 7/2017 | Arcese et al. |
| 2017/0206207 A1 | 7/2017 | Bondurant et al. |
| 2017/0214738 A1 | 7/2017 | Agarwal et al. |
| 2017/0220661 A1 | 8/2017 | Cao et al. |
| 2017/0228300 A1 | 8/2017 | Thomas |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0262346 A1 | 9/2017 | Pradhan et al. |
| 2017/0264684 A1 | 9/2017 | Spillane |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2017/0302731 A1 | 10/2017 | Cui |
| 2018/0004766 A1 | 1/2018 | Darling |
| 2018/0014650 A1 | 1/2018 | Tao |
| 2018/0062993 A1 | 3/2018 | Wu et al. |
| 2018/0129426 A1 | 5/2018 | Aron et al. |
| 2018/0143845 A1 | 5/2018 | Chawla et al. |
| 2018/0145960 A1 | 5/2018 | Bakshan |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0196719 A1 | 7/2018 | Glass |
| 2018/0205787 A1 | 7/2018 | Ben Dayan et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Gopalapura Venkatesh et al. |
| 2019/0034240 A1 | 1/2019 | Nabi |
| 2019/0079747 A1 | 3/2019 | Sinha et al. |
| 2019/0129808 A1 | 5/2019 | Acharya et al. |
| 2019/0196718 A1 | 6/2019 | Pai et al. |
| 2019/0207925 A1 | 7/2019 | Anantha Padmanaban et al. |
| 2019/0286832 A1 | 9/2019 | Szeto et al. |
| 2019/0332683 A1 | 10/2019 | Thummala et al. |
| 2019/0339883 A1 | 11/2019 | Aron |
| 2020/0007530 A1 | 1/2020 | Mohamad Abdul et al. |
| 2020/0012637 A1 | 1/2020 | Strauss |
| 2020/0034069 A1 | 1/2020 | Batra |
| 2020/0036647 A1 | 1/2020 | Gupta et al. |
| 2020/0081704 A1 | 3/2020 | Bafna et al. |
| 2020/0081733 A1 | 3/2020 | Buck |
| 2020/0106669 A1 | 4/2020 | Dhillon et al. |
| 2020/0125580 A1 | 4/2020 | Shao |
| 2020/0137157 A1 | 4/2020 | Joseph |
| 2020/0274869 A1 | 8/2020 | Tahenakos et al. |
| 2021/0081432 A1 | 3/2021 | Grunwald et al. |
| 2021/0141630 A1 | 5/2021 | Sharpe |
| 2021/0165759 A1 | 6/2021 | Bar-Nissan et al. |
| 2021/0200641 A1 | 7/2021 | Bafna |
| 2021/0224233 A1 | 7/2021 | Bafna |
| 2021/0247973 A1 | 8/2021 | Gupta |
| 2021/0334178 A1 | 10/2021 | Yang |
| 2021/0344772 A1 | 11/2021 | Arikatla |
| 2021/0349859 A1 | 11/2021 | Bafna |
| 2021/0365257 A1 | 11/2021 | Gopalapura Venkatesh |
| 2021/0390080 A1 | 12/2021 | Tripathi |
| 2021/0397587 A1 | 12/2021 | Thummala |
| 2021/0406136 A1 | 12/2021 | Venkatesh |
| 2022/0004377 A1 | 1/2022 | Sharpe |
| 2022/0147342 A1 | 5/2022 | Sharpe et al. |
| 2022/0147495 A1 | 5/2022 | Sharpe et al. |
| 2022/0156107 A1 | 5/2022 | Bafna et al. |

FOREIGN PATENT DOCUMENTS

| | | |
|---|---|---|
| CN | 110516005 | 11/2019 |
| CN | 110519112 A | 11/2019 |
| CN | 110569269 | 12/2019 |
| EP | 1 229 443 A2 | 8/2002 |
| EP | 1062581 | 10/2003 |
| EP | 1214663 B1 | 6/2006 |
| EP | 1979814 A2 | 10/2008 |
| WO | WO 2010050944 | 5/2010 |
| WO | WO 2011078646 A1 | 6/2011 |
| WO | WO 2012126177 | 9/2012 |
| WO | WO 2014200564 A1 | 12/2014 |
| WO | WO 2016018446 | 2/2016 |
| WO | WO 2018014650 | 1/2018 |
| WO | WO 2020180291 A1 | 9/2020 |

OTHER PUBLICATIONS

Final Office Action for U.S. Appl. No. 15/160,347 dated Mar. 16, 2020.

Final Office Action for U.S. Appl. No. 15/160,347 dated Jan. 28, 2019.

(56) References Cited

OTHER PUBLICATIONS

Non-Final Office Action for U.S. Appl. No. 15/160,347 dated Sep. 6, 2019.
Non-Final Office Action for U.S. Appl. No. 15/160,347 dated Jun. 29, 2018.
Notice of Allowance for U.S. Appl. No. 15/160,347 dated Aug. 4, 2021.
Notice of Allowance for U.S. Appl. No. 15/160,347 dated Mar. 10, 2021.
Notice of Allowance for U.S. Appl. No. 15/160,347 dated Nov. 4, 2020.
Wikipedia, "Compare-and-swap", Nov. 9, 2015, 6 pages.
Leslie Lamport, "Paxos Made Simple", Nov. 1, 2001, 14 pages.
Non-final Office Action dated Jul. 7, 2015 for related U.S. Appl. No. 14/278,363.
Non-final Office Action dated Jul. 16, 2015 for related U.S. Appl. No. 14/584,466.
International Search Report and Written Opinion dated Aug. 20, 2015, for related PCT Patent Application No. PCT/US15/31096, 8 pages.
International Search Report and Written Opinion dated Aug. 26, 2015, for related PCT Patent Application No. PCT/US15/31096, 8 pages.
Final Office Action dated Feb. 25, 2016 for related U.S. Appl. No. 14/584,466.
Final Office Action dated Mar. 23, 2016 for related U.S. Appl. No. 14/278,363.
Notice of Allowance and Fee(s) due dated Jul. 19, 2016 for related U.S. Appl. No. 14/206,869.
Alexander Shraer, et al., "Dynamic Reconfiguration of Primary/Backup Clusters," dated 2011, 13 pages.
Notice of Allowance and Fee(s) due dated Oct. 30, 2015 for related U.S. Appl. No. 14/144,520.
International Search Report and Written Opinion dated Aug. 7, 2015, for corresponding PCT Patent Application No. PCT/US2015/030026, 10 pages.
Non-final Office Action dated Jul. 17, 2015 for related U.S. Appl. No. 14/206,869.
PCT International Search Report and Written Opinion dated Jun. 15, 2015 for related PCT Patent Application No. PCT/US2015/020139.
Final Office Action dated Jan. 25, 2016 for related U.S. Appl. No. 14/206,869.
Non-final Office Action dated Sep. 22, 2016 for related U.S. Appl. No. 14/584,466.
Citrix, "Citrix XenServer 6.0 Administrator's Guide", Copyright 2012 Citrix Systems, Inc., 207 pages.
John L Hufferd, Hufferd Enterprises, SNIA, "IP Storage Protocols: iSCSI", Copyright 2011 Storage Networking Industry Association, 46 pages.
VMware, Technical White Paper, "Multipathing Configuration for Software iSCSI Using Port Binding", Copyright 2012 Vmware, Inc., 15 pages.
Non-final Office Action dated Oct. 7, 2016 for related U.S. Appl. No. 14/278,363.
Notice of Allowance and Fee(s) due dated Oct. 24, 2016 for related U.S. Appl. No. 14/206,869.
Non-final Office Action dated Nov. 1, 2016 for related U.S. Appl. No. 14/708,091.
Notice of Allowance and Fee(s) due dated Apr. 5, 2017 for related U.S. Appl. No. 14/584,466.
Ajmani et al., "Scheduling and Simulation: How to Upgrade Distributed Systems," HotOS IX: The 9th Workshop on Hot Topics in Operating Systems, USENIX, 2003, pp. 43-48.
Kochut, Andrzej and Alexei Karve, "Leveraging Local Image Redundancy for Efficient Virtual Machine Provisioning," 2012 IEEE Network Operations and Management Symposium, Jun. 8, 2012, pp. 179-187.
Soules et al.; "Metadata Efficiency in a Comprehensive Versioning File System", May 2002, CMU-CS-02-145, School of Computer Science, Carnegie Mellon University, Pittsburgh, PA 15213, 33 pages.
Notice of Allowance and Fee(s) due dated Apr. 10, 2017 for related U.S. Appl. No. 14/278,363.
Final Office Action dated Apr. 20, 2017 for related U.S. Appl. No. 14/708,091.
Notice of Allowance and Fee(s) due dated May 15, 2017 for related U.S. Appl. No. 15/069,961.
Non-Final Office Action dated Jan. 26, 2017 for related U.S. Appl. No. 15/069,961.
Non-Final Office Action dated Jul. 12, 2017 for related U.S. Appl. No. 14/610,285.
European Search Report dated May 5, 2017 for related EP Application No. 15792334.3, 13 pages.
European Search Report dated May 19, 2017 for related EP Application No. 15788922.1, 11 pages.
Non-Final Office Action dated Aug. 24, 2017 for related U.S. Appl. No. 14/708,091.
Final Office Action dated Jan. 9, 2018 for related U.S. Appl. No. 14/610,285.
European Extended Search Report dated Jan. 15, 2018 for related EP Application No. 15762234.1, 19 pages.
Final Office Action dated Feb. 27, 2018 for related U.S. Appl. No. 14/708,091.
Advisory Action dated May 18, 2018 for related U.S. Appl. No. 14/708,091.
Non-Final Office Action dated Jun. 7, 2018 for related U.S. Appl. No. 15/294,422.
First Office Action dated Jul. 30, 2018 for related European Application No. 15762234.1, 6 pages.
Notice of Allowance dated Sep. 6, 2018 for related U.S. Appl. No. 14/708,091, 8 pages.
Intention to Grant dated Jan. 3, 2019 for related EP Application No. 15792334.3, 7 pages.
Non-Final Office Action dated Nov. 14, 2018 for related U.S. Appl. No. 15/678,893, 7 pages.
Notice of Allowance dated Nov. 20, 2018 for related U.S. Appl. No. 15/294,422, 7 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Alibaba Cloud, "AliSQL X-Cluster: An MySQL Database with Superior Performance and Strong Consistency", (Dec. 8, 2019).
Cano, I. et al., "Curator: Self-Managing Storage for Enterprise Clusters", 14th USENIX Symposium on Networked Systems Design and Implementation, NSDI '17, (Mar. 27, 2017).
Poitras, Steven. "The Nutanix Bible" (Jul. 9, 2019), from https://nutanixbible.com/ (Publication date based on indicated capture date by Archive.org; first publication date unknown).

(56) References Cited

OTHER PUBLICATIONS

Poitras, Steven. "The Nutanix Bible" (Feb. 3, 2020), from https://nutanixbible.com/ (Publication date based on indicated capture date by Archive.org; first publication date unknown).
Final Office Action dated Aug. 5, 2020 for U.S. Appl. No. 16/041,348.
Mizrak, A. T. et al., "VMware vCenter Server High Availability Performance and Best Practices", VMware vCenter Server 6.5, Performance Study, VMware, (Nov. 2016).
VMware, "vSAN Planning and Deployment", VMware vSphere 7.0, VMware vSAN 7.0, VMware, Inc., (Apr. 2, 2020).
VMware, "VMware Infrastructure, Automating High Availability (HA) Services with VMware HA", VMware Technical Note, (Revised on Jun. 5, 2006).
VMware, "VMware® High Availability (VMware HA): Deployment Best Practices", VMware® vSphere™ 4.1, Technical White Paper, (Dec. 10, 2010), date retrieved from google.
Potheri, M. et al., "VMware vCenter Server™ 6.0, Availability Guide", Technical Marketing Documentation, Version 1.0, (May 2015).
McCarty, J., "VMware® Virtual SAN™ Stretched Cluster: Bandwidth Sizing Guidance", Technical White Paper, VMware, (Jan. 26, 2016), date retrieved from google.
McCarty, J., "VMware® Virtual SAN™ 6.1 Stretched Cluster & 2 Node Guide", Storage and Availability Business Unit, VMware, v 6.1.0c, version 0.20, (Jan. 2016).
Hogan, C., "VMware Virtual SAN Health Check Guide", Storage and Availability Business Unit, VMware, v 6.1.0, (Sep. 2015).
Dell: "High Availability and Data Protection With Dell EMC Isilon Scale-Out NAS", (Jul. 2018), Dell Inc.
Jcosta et al., "High Availability Setup Using Veritas Cluster Server and NetApp Synchronous SnapMirror—One button Failover-Failback with SnapMirror Sync and Veritas Cluster Server", (Nov. 18, 2010), NetApp Community.
NetApp: "Preparing storage systems for SnapMirror replication", (Jul. 2015), NetApp, Inc.
Bounds, J., "High-Availability (HA) Pair Controller Configuration Overview and Best Practices", (Feb. 2016), NetApp, Inc.
NetApp, "Clustered Data ONTAP 8.2 File Access Management Guide for CIFS", NetApp, Inc., (Feb. 2014).
Jung, Y. et al. "Standard-based Virtual Infrastructure Resource Management for Distributed and Heterogeneous Servers", ICACT, (Feb. 15, 2009).
Dell EMC, "Dell EMC Isilon OneFS Operating System, Scale-out NAS to maximize the data capital and business value of your unstructured data", Data Sheet, (Jan. 31, 2019), date retrieved from google.
Dell EMC, "Dell EMC Isilon OneFS Operating System, Powering the Isilon Scale-Out Storage Platform", White Paper, (Dec. 2019).
EMC, "EMC Isilon OneFS Operating System, Powering scale-out storage for the new world of Big Data in the enterprise", Data Sheet, (Apr. 2013).
EMC, Isilon OneFS, Version 8.0.1, Web Administration Guide, EMC Corporation, (Oct. 2016).
NetApp, "Enabling or disabling SMB automatic node referrals", ONTAP 9 Documentation Center, NetApp, Inc., (Updated Dec. 2020), from https://docs.netapp.com/ontap-9/index.jsp?topic=%2Fcom.netapp.doc.cdot-famg-cifs%2FGUID-AC7E8515-3A4C-4BB5-A8C8-38B565C952E0.html.
NetApp, "Guaranteeing throughput with QoS", ONTAP 9 Documentation Center, NetApp, Inc., (Updated Dec. 2020), from https://docs.netapp.com/ontap-9/index.jsp?topic=%2Fcom.netapp.doc.pow-perf-mon%2FGUID-77DF9BAF-4ED7-43F6-AECE-95DFB0680D2F.html.
NetApp. "How to troubleshoot the 'Autolocation' feature in Clustered Data ONTAP", Knowledgebase, NetApp, (Jun. 4, 2019).
NetApp. "How to troubleshoot the 'Autolocation' feature in Clustered Data ONTAP—Results", Knowledgebase, NetApp, (Captured on Sep. 19, 2019).
Cloudian, "Hybrid Cloud Storage with Cloudian HyperStore and Amazon S3", Solution Brief, Cloudian Inc., (Aug. 2015).
NetApp, "Improving client response time by providing SMB automatic node referrals with Auto Location", NetApp, Inc., (May 2013), from https://library.netapp.com/ecmdocs/ECMP1196891/html/GUID-0A5772A4-A6D7-4A00-AC2A-92B868C5B3B5.html.
NetApp, "Managing Workloads", ONTAP 9 Documentation Center, NetApp, Inc., (Updated Dec. 2020), from https://docs.netapp.com/ontap9/index.jsp?topic=%2Fcom.netapp.doc.pow-perf-mon%2FGUID-13D35FC5-AF37-4BBD-8A8E-B10B41451A16.html.
Nutanix, "Nutanix AFS—Introduction & Steps for Setting Up", (Jan. 3, 2018), from https://virtual building blocks. com/2018/01/03/nutanix-afs-introduction-steps-for-setting-up/.
NetApp, "Protect Your Data with NetApp Element Software", Solution Brief, NetApp, (Oct. 11, 2020), date retrieved from google.
Kemp, E., "NetApp SolidFire SnapMirror Architecture and Configuration", Technical Report, NetApp, (Dec. 2017).
Kleyman, B., "How Cloud Computing Changes Storage Tiering", DataCenter Knowledge, (Nov. 12, 2015).
Poitras, Steven. "The Nutanix Bible" (Aug. 1, 2020), from https://nutanixbible.com/ (Publication date based on indicated capture date by Archive.org; first publication date unknown).
Virtuadmin, "Configure Vcenter High Availability", Virtubytes, (Sep. 14, 2017).
Non-Final Office Action dated Sep. 30, 2020 for related U.S. Appl. No. 16/177,126.
U.S. Appl. No. 17/129,425 titled "Parallel Change File Tracking in a Distributed File Server Virtual Machine (FSVM) Architecture" filed Dec. 21, 2020.
U.S. Appl. No. 16/942,929 titled "Method Using Access Information in a Distributed File Server Virtual Machine (FSVM) Architecture, Including Web Access"; filed Jul. 30, 2020.
U.S. Appl. No. 16/944,323 titled "Actions Based on File Tagging in a Distributed File Server Virtual Machine (FSVM) Environment", filed Jul. 31, 2020.
U.S. Appl. No. 17/091,758 titled "Virtualized File Server Distribution Across Clusters", filed Nov. 6, 2020.
Notice of Allowance dated Mar. 3, 2021 for U.S. Appl. No. 16/041,348.
Rivera, R., "VMware Virtual SAN: Witness Component Deployment Logic", VMware vSphere Bloi, (Apr. 1, 2014).
Page, M. "EMC VPLEX Witness Deployment Within VMware Vcloud Air", White Paper, EMC, (Oct. 7, 2016).
EMC, "EMC VPLEX Witness Deployment Within VMware Vcloud Air", White Paper, EMC, (Jul. 2013).
"New VMware HCL category: vSphere Metro Stretched Cluster", Virtual Geek, (Oct. 5, 2011).
Lakkapragada, S. et al., "Site Recovery Manager and Stretched Storage: Tech Preview of a New Approach to Active-Active Data Centers", VMware, (Nov. 2014).
Epping, D., "Stretched vCloud Director Infrastructure", VMware, (Jan. 23, 2013).
Bernasconi, A. et al., "IBM SAN and SVC Stretched Cluster and VMware Solution Implementation", IBM Redbooks, (Apr. 2013).
Ashish, S. et al., "IBM SAN Volume Controller Stretched Cluster with PowerVM and PowerHA", IBM Redbooks, (Jul. 2013).
Dell, "Multi-AZ (stretched cluster)", Architecture Guide—VMware Cloud Foundation 3.10.01 on VxRail, Dell Technologies, (Oct. 2001).
Daveberm, "Step-by-Step: Configuring a 2-Node Multi-Site Cluster on Windows Server 2008 R2—Part 1", Clustering for Mere Mortals, (Sep. 15, 2009).
"Failover Clustering (III)", Networks & Servers Blog, (Sep. 2011).
Sarmiento, E., "Force Start a Windows Server Failover Cluster without a Quorum to bring a SQL Server Failover Clustered Instance Online", (Aug. 22, 2014).
Horenbeeck, M. V., "Spooky! The Curious Case of the 'Ghost' File Share Witness . . . ", (Jul. 15, 2014).
VMware, "Administering VMware Virtual SAN: VMware vSphere 6.5, vSAN 6.6", VMware, (Jun. 26, 2017).
Littman, M. L., "The Witness Algorithm: Solving Partially Observable Markov Decision Process", Brown University, (Dec. 1994).
Oracle, "Deploying Microsoft SQL Server Always on Availability Groups", Oracle White Paper, (Sep. 2018).

(56) References Cited

OTHER PUBLICATIONS

Enterprisedb, "EDB Failover Manager Guide: Failover Manager Version 2.0.3", EnterpriseDB Corporation, (Dec. 18, 2015).
"Explaining the Stormagic SvSAN Witness", White Paper, (Aug. 29, 2018).
"2016 Failover cluster using Azure blob as a cluster quorum", Teckadmin, (Mar. 31, 2019).
Deschner, G. et al., "Calling the Witness: SMB3 Failover with Samba/CTDB", Redhat, (Oct. 2, 2015).
Microsoft, "High Availability Solutions: SQL Server 2012 Books Online", Microsoft (Jun. 2012).
Mitchell, D., "Introduction to VMware vSAN™ for VMware Cloud Providers™," Version 2.9, VMware, (Jan. 2018).
Mitchell, D., "Introduction to VMware vSAN™ for VMware vCloud Air™ Network", Version 2.7, VMware, (Feb. 2017).
Paderin, M. "Analysis of Server Clustering Its Uses and Implementation", Bachelor's thesis Information Technology, (Dec. 2017).
VMware, "Virtualizing Microsoft Applications on VMware Virtual SAN", Reference Architecture, VMware, (Apr. 2, 2015).
Deschner, G., "Implementing the Witness protocol in Samba", Redhat, (Jun. 22, 2015).
Deschner, G., "Cluster improvements in Samba4", Redhat, (May 30, 2016).
Ngyuen, L., "SMB 3 Transparent Failover for Hitachi NAS Platform 4000 Series", Tech Note, Hitachi Data Systems, (Nov. 2016).
Mizrak, A. T. et al., "VMware vCenter Server High Availability Performance and Best Practices, VMware vCenter Server 6.5", VMware, (Nov. 2016).
McCarty, J. "VMware Horizon 6 with App Volumes and Virtual SAN Reference Architecture", Storage and Availability Business Unit, VMware (Jan. 2016).
VMware, "VMware Horizon 6 with App Volumes and Virtual SAN Reference Architecture", Technical White Paper, VMware, (Apr. 9, 2011), date retrieved from google.
Feroce, D., "Leveraging VMware vSAN™ for Highly Available Management Clusters", Version 2.9, VMware, (Jan. 2018).
VMware, "Deployment for Multiple Availability Zones", VMware Validated Design for Software-Defined Data Center 4.3, VMware, (Jul. 17, 2018).
McCarty, J., "VMware® Virtual SAN™ 6.1 Stretched Cluster & 2 Node Guide", v 6.1.0c, version 0.20, VMware, (Jan. 2016).
Hogan, C., "VMware Virtual SAN Health Check Guide", Storage and Availability Business Unit, v 6.1.0, VMware, (Sep. 2015).
Banerjee, A. et al., "VMware Virtual SAN™ Stretched Cluster: Performance and Best Practices", Technical White Paper, VMware, (Oct. 22, 2015).
Hosken, M., "VMware vSAN™ Two-Node Architecture VMware Cloud Provider™ Use Cases", Version 2.9, VMware, (Jan. 2018).
"VMware Virtual SAN 6.2", Licensing Guide, VMware, (Revised Jun. 2016).
Hunter, J., "VMware Virtual SAN 6.2", PCI DSS Compliance Guide, (Revised Feb. 2016).
"VMware Virtual SAN: SAP Applications", Solution Overview, VMware, (May 6, 2016).
Eckerle, A. et al., "What's New in VMware vSphere® 6.5", Technical White Paper, (Nov. 15, 2016).
Notice of Allowance dated Jun. 24, 2021 for U.S. Appl. No. 16/041,348.
Non-Final Office Action dated Aug. 5, 2021 for related U.S. Appl. No. 16/747,272.
Non-Final Office Action dated Sep. 7, 2021 for U.S. Appl. No. 16/947,444.
Poitras, Steven. "The Nutanix Bible" (Jan. 30, 2021), from https://nutanixbible.com/ (Publication date based on indicated capture date by Archive.org; first publication date unknown).
Poitras, Steven. "The Nutanix Bible" (Sep. 9, 2022), from https://nutanixbible.com/ (Publication date based on indicated capture date by Archive.org; first publication date unknown).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Notice of Allowance for U.S. Appl. No. 16/947,444 dated Apr. 27, 2023.
Non-Final Office Action dated Feb. 4, 2020 for U.S. Appl. No. 16/041,348.
Final Office Action dated Apr. 26, 2021 for related U.S. Appl. No. 16/177,126.
Notice of Allowance dated Dec. 8, 2021 for related U.S. Appl. No. 16/747,272.
Final Office Action dated Dec. 27, 2021 for U.S. Appl. No. 16/947,444.
"Setting up and Using Acropolis File Services (AFS) on Nutanix AOS 5.0"; Virtual Dennis—Sharing Technical Tips Learned the Hard Way; Posted Dec. 30, 2016; pp. all.
Bas van Kaam "New in AOS 5.0: Nutanix Acropolis File Services"; basvankaam.com; Jan. 5, 2017; pp. all.
Ruth, Paul "Autonomic Live Adaptation of Virtual Computational Environments in a Multi-Domain Infrastructure"; 2006 IEEE International Conference on Autonomic Computing, 2006, pp. 5-14.
Illingworth, T., "Enable or disable SMB automatic node referrals," dated Dec. 9, 2021, URL: https://docs.netapp.com/ontap-9/index.jsp?topic=%2Fcom.netapp.doc.cdot-famg-cifs%2FGUID-AC7E8515-3A4C-4BB5-A8C8-38B565C952E0.html.
Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021.
Illingworth, T, "Guarantee throughput with QoS overview," dated Dec. 9, 2021, NetApp, URL: https://docs.netapp.com/ontap-9/index.jsp?topic=%2Fcom.netapp.doc.pow-perf-mon%2FGUID-77DF9BAF-4ED7-43F6-AECE-95DFB0680D2F.html.
"Manage workloads," NetApp, dated Oct. 14, 2021, URL: https://docs.netapp.com/ontap-9/index.jsp?topic=%2Fcom.netapp.doc.pow-perf-mon%2FGUID-13D35FC5-AF37-4BBD-8A8E-B10B41451A16.html.
"Backup vSAN 7 File Share with Veeam Backup & Replication 10," Sysadmin Stories, dated Jun. 2, 2020, URL: https://www.sysadminstories.com/2020/06/backup-vsan-7-file-share-with-veeam.html.
VSphere Storage; Update 2; VMware vSphere 7.0; VMware ESXi 7.0; vCenter Server 7.0; dated Jun. 25, 2021 https://docs.vmware.com/en/VMware-vSphere/7.0/vsphere-esxi-vcenter-server-702-storage-guide.pdf.
VMWare Datasheet; https://www.vmware.com/content/dam/digitalmarketing/vmware/en/pdf/products/vCenter/vmware-vcenter-server-datasheet.pdf, captured Aug. 20, 2021.
"VSAN 7.0 U2 Proof of Concept Guide," dated Apr. 2021 https://images.core.vmware.com/sites/default/files/resource/vsan_70_u2_proof_of_concept_guide_noindex.pdf.
"VSAN Health Service—File Service—File Server Health (77165)," VMware, Knowledge Base, dated Oct. 4, 2021, URL: https://kb.vmware.com/s/article/77165.
Update 3, VMWare vSphere 6.7; VMware vSAN 6.7; dated Aug. 20, 2019, https://docs.vmware.com/en/VMware-vSphere/6.7/vsan-673-planning-deployment-guide.pdf.
"VSAN Stretched Cluster Guide," VMwareStorage, dated Jun. 2020, https://images.core.vmware.com/sites/default/files/resource/vsan_stretched_cluster_guide_noindex.pdf.
"The Wonderful World of Distributed Systems and the Art of Metadata Management," Nutanix, Inc., dated Sep. 24, 2015, URL: https://www.nutanix.com/blog/the-wonderful-world-of-distributed-systems-and-metadata-management.
Fojta, T. "Quotas and Quota Policies in VMware Cloud Director," Tom Fojta's Blog, dated Nov. 6, 2020.
Fojta, T., "vSAN File Services with vCloud Director," Tom Fojta's Blog, dated Apr. 6, 2020.
Hogan, C., New updates from Nutanix—NOS 3.0 and NX-3000, dated Dec. 20, 2012, URL: https://cormachogan.com/2012/12/20/new-from-nutanix-nos-3-0-nx-3000/.
Leibovici, A., "Nutanix One-Click Upgrade now takes care of Firmware and Hypervisor too!," myvirtualcloud.net, dated Jul. 31,

(56) References Cited

OTHER PUBLICATIONS

2014, URL: https://myvirtualcloud.net/nutanix-one-click-upgrade-now-takes-care-of-firmware-and-hypervisor-too/.
Rajendran, C, "Working with vSAN Health Checks," VMware vSan Virtual Blocks Blog, dated Jul. 18, 2019, URL: https://blogs.vmware.com/virtualblocks/2019/07/18/working-with-vsan-health-checks/.
Sturniolo, A., "VMware vSAN File Services and Veeam," Veeam Blog, dated Jul. 22, 2020, URL: https://www.veeam.com/blog/veeam-backup-vsan-file-services.html.
"Administering VMware vSAN, Update 1," VMWare, copyright 2020.
"Characteristics of a vSAN Cluster," VMWare, dated May 31, 2019.
"Native File Services for vSAN 7," cormachogan.com, dated Mar. 11, 2020.
"Nutanix Files Guide," Nutanix, dated Sep. 14, 2018.
Birk, R., "Understanding vSAN Architecture Components," VMWare, dated Feb. 28, 2018.
Seget, V., "VMWare vSAN 7 now with native file services and quotas," VMWare, dated May 1, 2020.
"VMWare vSAN 7.0 Release Notes," VMWare, dated Jun. 23, 2020.
Seget, V., "VMWare vSphere 7.0 and vSAN storage improvements," 4sysops, dated Apr. 1, 2020.
"VMWare vSphere VMFS Technical Overview and Best Practices," VMWare Technical White Paper, copyright 2012.
"Additional Use Cases and Support Using vSAN File Services," VMWare, copyright 2021.
VSphere Storage; Update 2; VMware vSphere 6.7; VMware ESXi 6.7; vCenter Server 6.7; dated Jan. 4, 2021.
VSphere Availibility, Update 1, VMWare, dated Jan. 11, 2019.
Screen captures from YouTube video clip entitled "Tech TopX: AHV One Click Upgrade," 13 pages, uploaded on Dec. 8, 2015 by user "Nutanix University". Retrieved from Internet: https://www.youtube.com/watch?v=3dALdzw6qZM.
"VSAN Performance Graphs in the vSphere Web Client," VMWare Knowledge Base, dated Nov. 9, 2020.
VSAN Monitoring and Troubleshooting, Update 1, VMWare vSphere 7.0, copyright 2020.
Non-Final Office Action for U.S. Appl. No. 16/947,444 dated May 17, 2022.
Notice of Allowance for U.S. Appl. No. 16/177,126 dated May 26, 2022.
Citrix XenDesktop 7.1 on Microsoft Hyper-V Server 2012 R2 on Nutanix Virtual Computing Platform, dated Jun. 25, 2014.
U.S. Appl. No. 17/866,225 titled Virtualized File Server Disaster Recovery filed Jul. 15, 2022.
U.S. Appl. No. 17/865,907 titled "Virtualized File Server Deployment" filed Jul. 15, 2022.
Hemmes, J., et al., "Cacheable Decentralized Groups for Grid Resource Access Control," Technical Report Jun. 2006, Department of Computer Science and Engineering, University of Notre Dame, dated 2006.
Lye, B., "Implementing Windows Server 2008 File System Quotas," Redgate, dated Nov. 19, 2009.
"VSAN File Services," VMwareStorage, VMWare, dated May 2020.
"Virtual Disk Manager User's Guide," Virtual Disk Development Kit, VMWare, copyright 2008.
Non-Final Office Action for U.S. Appl. No. 16/177,126 dated Sep. 16, 2022.
Final Office Action for U.S. Appl. No. 16/947,444 dated Nov. 30, 2022.
Notice of Allowance dated Jan. 24, 2023 for U.S. Appl. No. 16/177,126.
Notice of Allowance for U.S. Appl. No. 16/947,444 dated Mar. 1, 2023.
Notice of Allowance for U.S. Appl. No. 16/177,126 dated Apr. 12, 2023.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Notice of Allowance dated Mar. 20, 2019 for related U.S. Appl. No. 15/678,893, 5 pages.
Notice of Allowance dated Mar. 26, 2019 for related U.S. Appl. No. 15/294,422, 7 pages.
Notice of Allowance dated Nov. 19, 2019 for related U.S. Appl. No. 14/708,091.
Notice of Allowance dated Dec. 27, 2019 for related U.S. Appl. No. 14/610,285.
E.S., "Nutanix Two-Node Clusters", (Jun. 18, 2018), from http://vpash.com/nutanix/nutanix-two-node-clusters/, pp. all.
Configuring a Witness (two-node cluster) (Jul. 16, 2018), 3 pages.
Gupta, Upasna. "Unlocking the ROBO/Edge IT Landscape with the Launch of Nutanix 1-node Cluster" (Jan. 19, 2018), 7 pages.
Liu, M. "Fine-Grained Replicated State Machines for a Cluster Storage System", in the Proceedings of the 17th USENIX Symposium on Networked Systems Design and Implementation (NSDI '20), (Feb. 25-27, 2020).
Junqueira, F. P., "Zab: High-performance broadcast for primary-backup systems", 2011 IEEE/IFIP 41st International Conference on Dependable Systems & Networks (DSN), (Jun. 27-30, 2011).
Redis, "Redis Sentinel Documentation", (Jul. 23, 2012), date retrieved from google.
RabbitMQ, "Quorum Queues", (Nov. 14, 2019), date retrieved from google.
Cao, W.,"PolarFS: An Ultra-low Latency and Failure Resilient Distributed File System for Shared Storage Cloud Database", Proceedings of the VLDB Endowment, vol. 11, No. 12, (Aug. 2018).

* cited by examiner

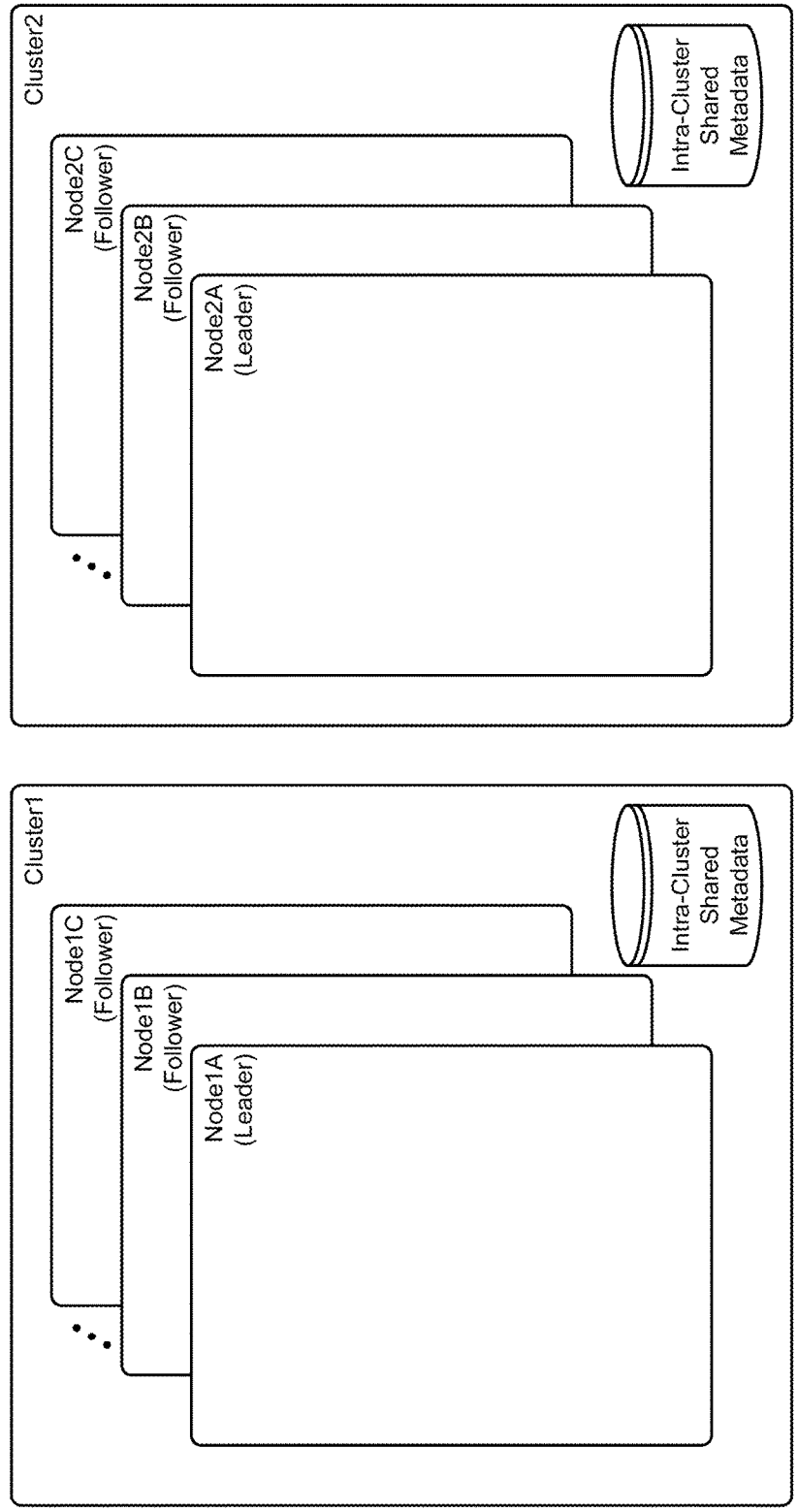
FIG. 1A1

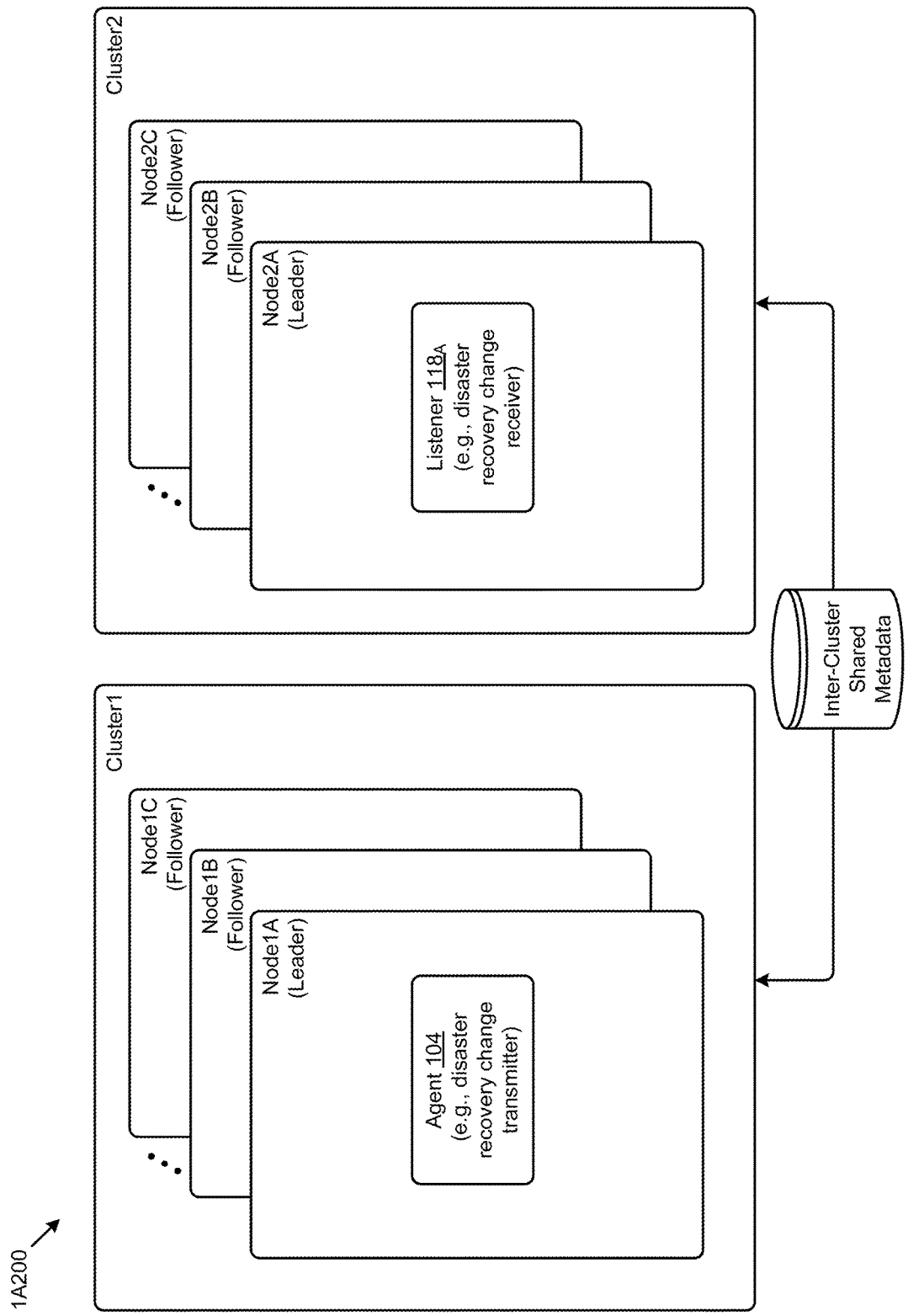
FIG. 1A2

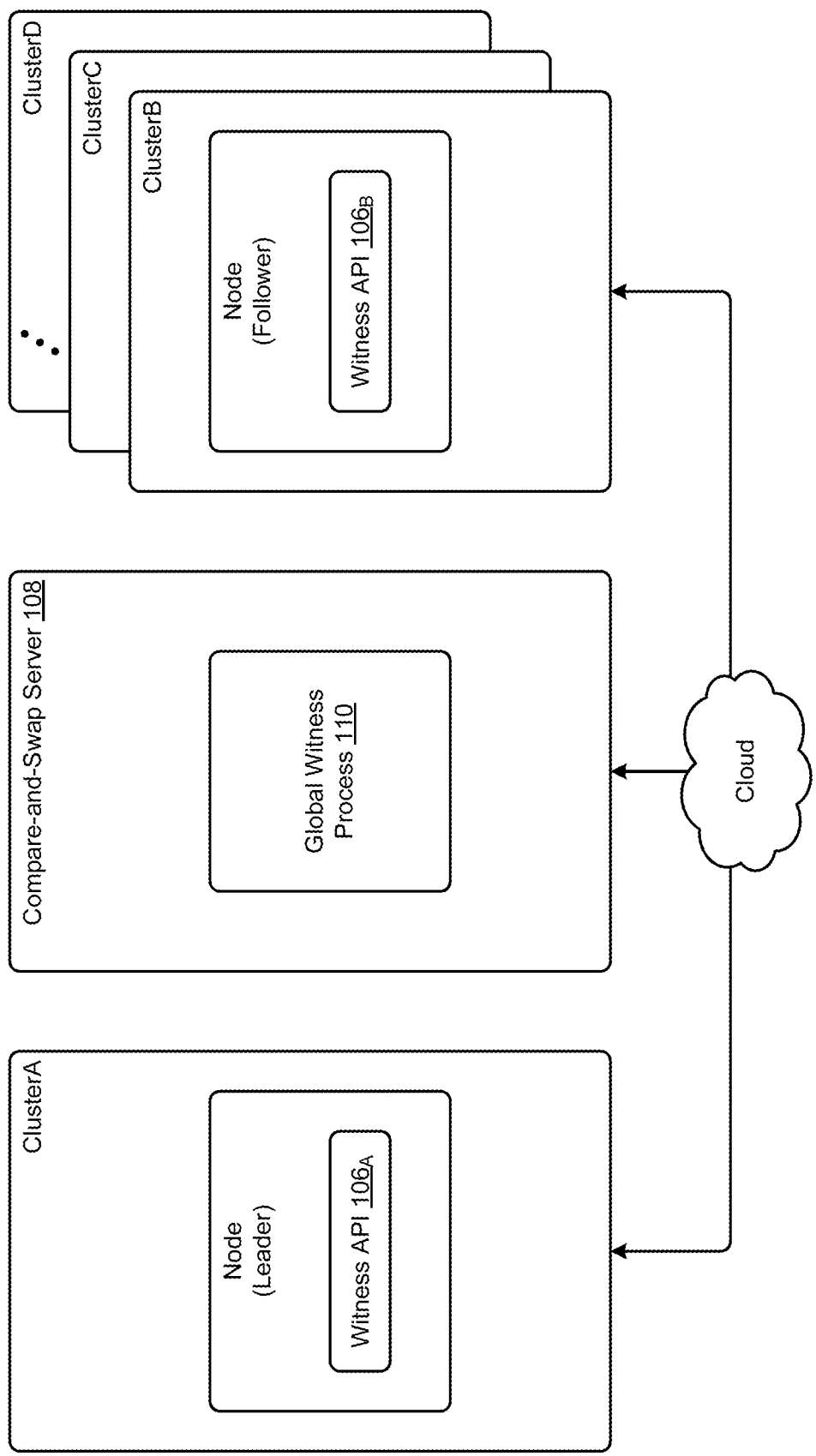
FIG. 1B1

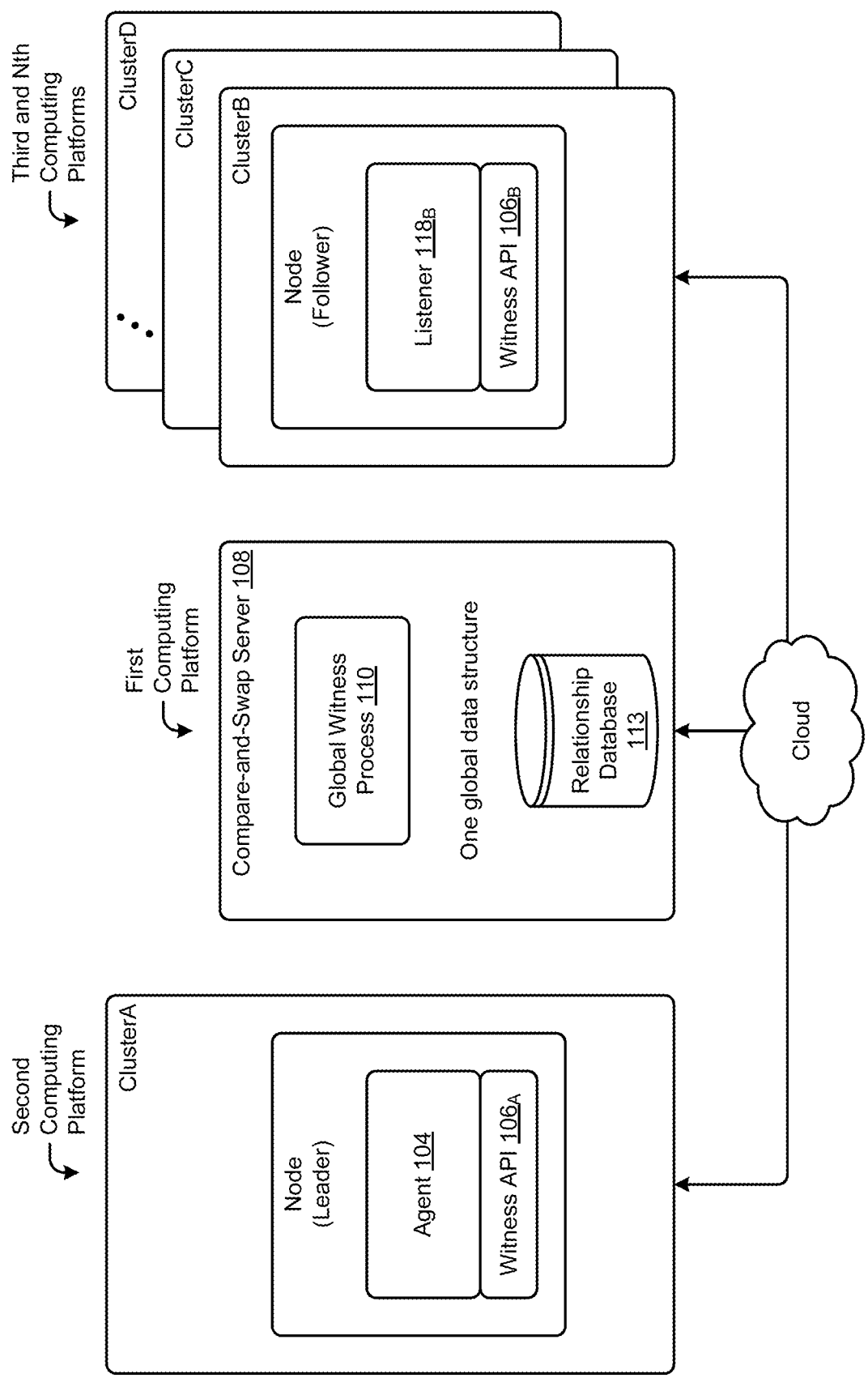
FIG. 1B2

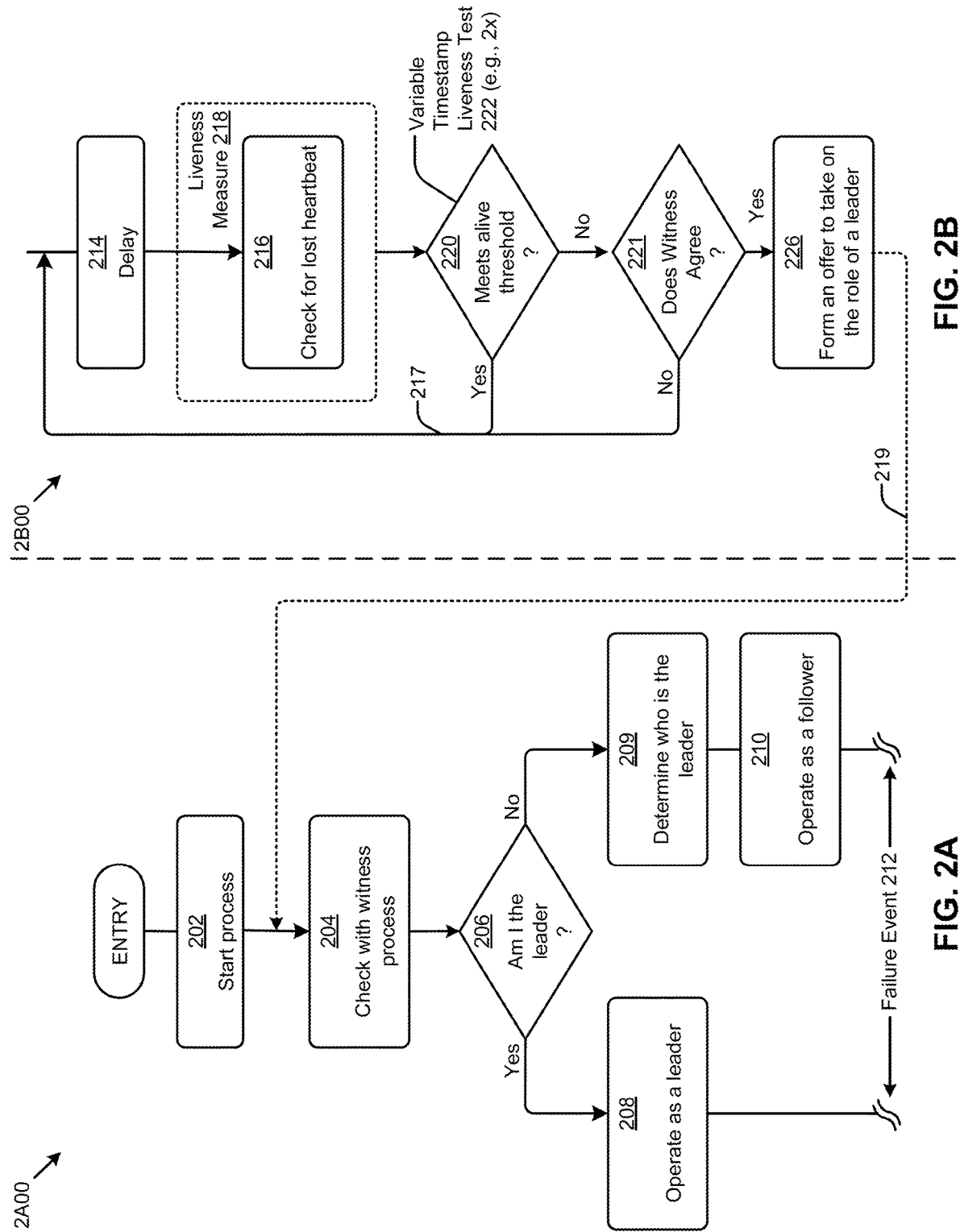

SCALABLE LEADERSHIP ELECTION IN A MULTI-PROCESSING COMPUTING ENVIRONMENT

RELATED APPLICATIONS

The present application is a continuation of U.S. patent application Ser. No. 15/160,347 titled "SCALABLE LEADERSHIP ELECTION IN A MULTI-PROCESSING COMPUTING ENVIRONMENT", filed on May 20, 2016, which is hereby incorporated by reference in its entirety.

FIELD

This disclosure relates to architectures for high-availability multi-processing computing platforms, and more particularly to techniques for scalable leadership election using a global witness process in a multi-cluster computing environment.

BACKGROUND

Some computing tasks are parallelized such that there is a master (or leader) and many slaves (or followers). Often, the software images that are executed by the instance of the leader and the instances of followers is the same image, and the determination as to whether a particular instance is to act as the leader or act as a follower is made on the basis of the existence and/or contents of a status file that is accessed by the image. Under such a scenario, it can happen that a group of instances are deployed (e.g., started up as individual processes or individual threads) and the determination as to which one member of the group becomes the leader is made by the first instance to "come up" and create and/or write a value into the aforementioned status file. The file system serves as a sequencer/arbiter as to which one process or thread from the group becomes the leader.

At some point after initial determination of the leader, the leader might "die" (e.g., the thread stops unexpectedly, or the process runs into a segmentation or other fault). This leaves the aforementioned file in a state that does not reflect the actual state (e.g., that there is no leader anymore). Additional functions need to be provided so as to "re-elect" a leader in the case that the former leader no longer has the capacity to serve in the leader's role. Some mechanisms have been attempted where all processes or threads periodically check for a "heartbeat" or other periodic liveness signal from the leader, and if such a heartbeat or other periodic liveness signal from the assigned leader is not detected, then the followers will vote among themselves to determine a majority and, in turn, a new leader. In some cases an independent witness task process that functions other than as a leader or other than as a slave can be deployed, and can thenceforth be consulted to break a tie so that a majority can be formed.

Unfortunately, there are some deployments that have a leader-follower relationship between just two actors (e.g., processes, threads, virtual machines, etc.). In such cases, a majority cannot be formed after loss of leadership—since there then remains only one process. For example, in a disaster recovery situation, there might be a block change monitor that detects and forwards changed storage blocks to a listening backup process at another location (e.g., located on another cluster in a geographically distal location). If a leader (e.g., the block change monitor) were to die or become unreachable, the remaining slave (e.g., the listening backup process) by itself cannot use the aforementioned legacy techniques to reestablish a new leader.

Worse, in a large computing environment, such as an environment having multiple clustered computing platforms, there might be multiple file systems in operation. Legacy approaches that rely on leadership determination based on the first to create (or write to) the aforementioned status file cannot be used to elect just one leader from among the group of instances.

Still worse, legacy approaches that involve a witness deploy witness processes on a one-to-one basis with respect to the deployed master/slave images. Managing witnesses that are deployed one-to-one with respect to clusters (e.g., many actively involved witness processes) presents a management task that does not scale as the number of clusters increases.

What is needed is a technique or techniques to improve over legacy and/or over other considered approaches. Specifically, what is needed is a technique that provides a single witness process for an arbitrarily large number of clusters. Moreover, what is needed is a way for a single witness process to perform the functions of a witness or arbiter that is resilient to temporary or permanent node or cluster outages. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for scalable leadership election using a centralized witness process in a multi-processing computing environment, which techniques advance the relevant technologies to address technological issues with legacy approaches. More specifically, the present disclosure provides a detailed description of techniques used in systems, methods, and in computer program products for scalable leadership election using a centralized witness process in a multi-processing computing environment. Certain embodiments are directed to technological solutions for breaking a tie by using a centralized witness process that accesses a data structure under a compare-and-swap (CAS) access regime, which embodiments advance the relevant technical fields as well as advancing peripheral technical fields.

The disclosed embodiments modify and improve over legacy approaches. In particular, the herein-disclosed techniques provide technical solutions that address the technical problems attendant to in many modern computing deployments where a plurality of processes need to reach a consensus as to leader/follower relationships. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage systems.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1 and FIG. 1A2 depict distributed processing environments.

FIG. 1B1 and FIG. 1B2 depict uses of a global witness process in a distributed processing environment having a leader on one cluster and multiple followers on other clusters, according to some embodiments.

FIG. 2A presents a leadership determination flowchart to implement leadership election using a centralized witness process in a multi-processing computing environment, according to an embodiment.

FIG. 2B presents a liveness determination flowchart to implement leadership election using a centralized witness process in a multi-processing computing environment, according to an embodiment.

DETAILED DESCRIPTION

Figure 1C:
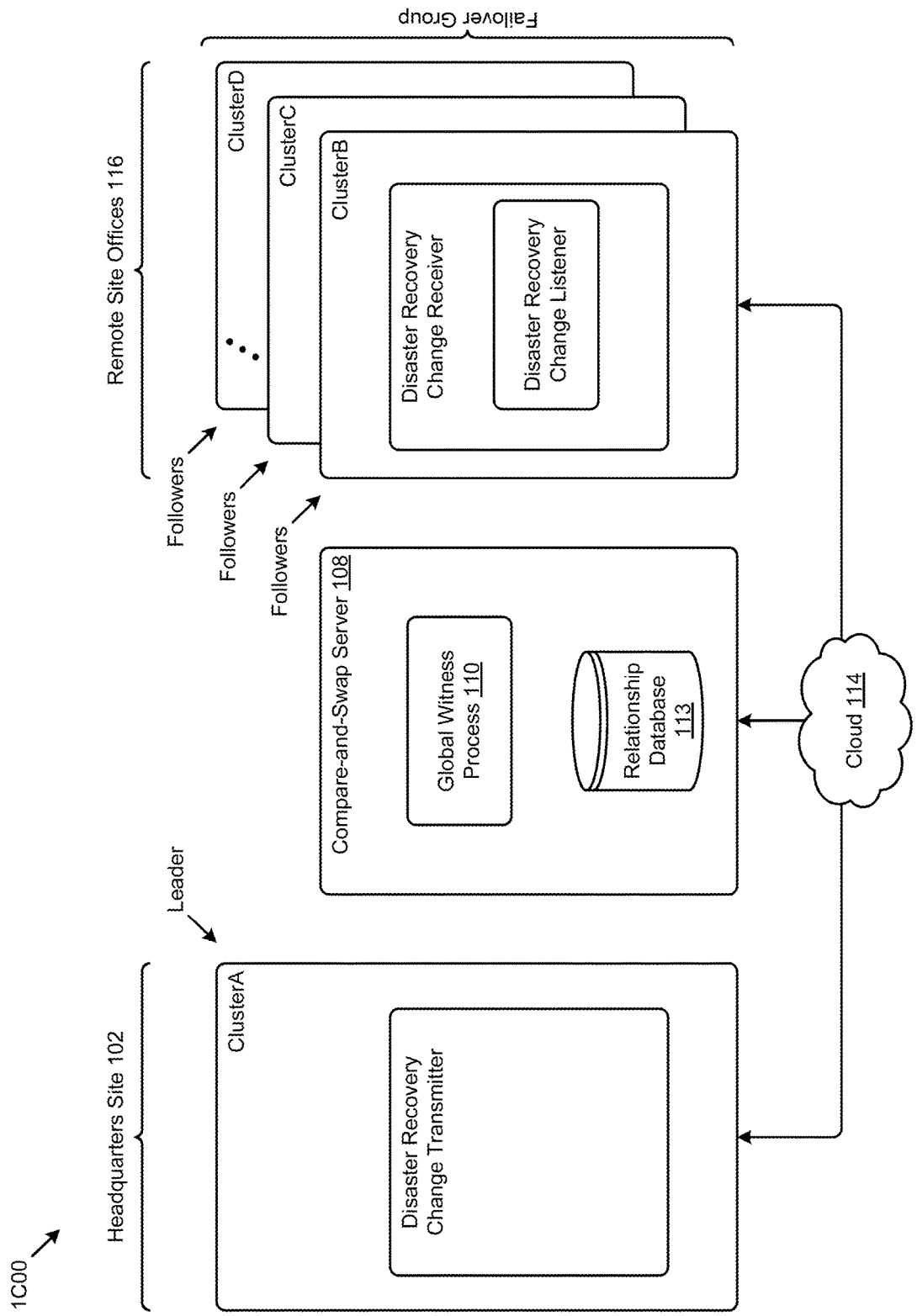
FIG. 1C depicts a remote office, branch office (ROBO) environment having a leader on one cluster and multiple followers on other clusters.

Some embodiments of the present disclosure address the problems exhibited in many modern computing deployments where a plurality of processes need to reach a consensus as to leader/follower relationships. Some embodiments are directed to approaches for breaking a tie by using a centralized witness process that accesses a data structure under a compare-and-swap (CAS) access regime. More particularly, disclosed herein and in the accompanying figures are exemplary environments, systems, methods, and computer program products for scalable leadership election using a centralized witness process in a multi-processing computing environment.

Overview

In an a priori manner (e.g., before deployment of any processes to perform any jobs) a single witness process is started up at one node that is accessible by any process or thread that is/are expected to perform either as a leader or as a follower.

Deployments that have various processes spread out over multiple clusters (e.g., over wide geographic areas) are often interconnected (e.g., over a cloud backbone, or over the internet) such that the various processes make continuous progress in synchronicity, where an agent/leader process or thread sends data to one or more listener/follower processes or threads. If it happens that an agent fails or ceases to communicate with the one or more listener/follower, then the synchronized progress stops and a new agent/leader is needed. In leader-follower scenarios, if it happens that a leader fails or ceases to communicate with the one or more followers, then the synchronized progress stops and a new leader is needed. In some deployments (e.g., clustered deployments) the nodes need to form a majority to form a consensus. An alternative method which is disclosed herein is to organize around an arbitrator, which arbitrator can pick a node to become the leader. A global witness service serves to bring the deployment back into service (e.g., with a newly elected leader and with all followers in agreement with the newly elected leader).

As can be understood, techniques that rely on multiple process access to a disk-based (e.g., SCSI) operation semaphore are only applicable when all of the processes to perform any jobs are in the same disk access group (e.g., in the same processor group, or cluster). Furthermore, legacy techniques that rely on a witness process to break a tie between a leader and follower are only applicable when all of the processes to perform any jobs are in cluster.

What is described herein is a global witness service. The figures provide successive disclosure of the concepts involved, including functions of a global witness service and including a range of implementation options. Strictly as an overview, the global witness service concept relies in part on a global witness process that provides leadership determination among a set of nodes. The global witness service uses a database that provides compare-and-swap properties. Each node in a deployment that offers to become a leader (e.g., upon detection or determination that the services of a leader has been lost) uses the same application programming interface to query the service, and the herein-disclosed global witness service will pick exactly one of the offerors in the cluster to become a leader. A database access method and data structure is disclosed. The service operates in conjunction with the data structure. For example the service, upon receiving a leadership offer from a node, will attempt to write a particularly-formed key/value pair using a compare-and-swap operation. If the particular compare-and-swap operation (e.g., using the particularly-formed key/value pair) succeeds, then the offeror becomes the leader. Otherwise, the global witness service deems that a leader has already been selected, and the offeror is so advised.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 depicts an environment 1A100 having multiple clusters, each cluster having a respective leader and multiple followers. Each cluster accesses intra-cluster shared metadata that is shared between nodes within the cluster. Intra-cluster shared metadata can be used to organize leader-follower activities within a cluster, but the intra-cluster data cannot be relied upon to organize leader-follower activities between the clusters. Inter-cluster shared data can be stored and accessed so as to facilitate organization of leader-follower activities between clusters. One example is given in the following FIG. 1A2.

FIG. 1A2 depicts an environment 1A200 having multiple clusters, with each cluster having a respective leader and multiple followers. A leader process on one platform communicates over a network to one or more follower processes on any cluster. In some situations the leader process (e.g., agent 104) is configured so as to detect system changes (e.g., storage operations, block changes, configuration changes, etc.) and to communicate a copy of those changes to a listener $118_A$ process in a different cluster, such as might be located in a geographically distant location accessible over a network.

The shown inter-cluster shared metadata is used by the agent and listeners to organize their relationships to each other (e.g., leader or follower). Leadership determination and follower determination can be used in a variety of multiple cluster scenarios. For example, in a disaster recovery scenario, the leader process in a first cluster is configured to detect and/or receive storage block changes (e.g., see agent 104) and to communicate copies of those storage block changes to one or more different clusters that run follower tasks (e.g., see listener $118_A$).

Architectures that involve deployment of a leader process on one cluster and one or more follower processes on a different cluster sometimes precipitate an unwanted task interaction scenario termed "split brain". Often, split-brain scenarios exhibit unwanted interactions, especially when sharing data. In scenarios that rely on uninterrupted availability of a leader task, even in high-availability scenarios, intended uninterrupted availability of a leader task can be interrupted (e.g., due to failure of a node or network or due to a cluster-wide outage or cluster-wide disaster). A witness process serves to avoid split-brain conflicts that can precipitate shared data corruption. A witness process resides in a failure domain that is separate from the leader process failure domain.

FIG. 1B1 and FIG. 1B2 depict uses of a global witness process in a distributed processing environment having a leader on one cluster and multiple followers on other clusters. As an option, one or more variations of distributed processing environment or any aspect thereof may be implemented in the context of the architecture and functionality of the embodiments described herein. In addition, the distributed processing environment or any aspect thereof may be implemented in any environment.

The embodiment shown in FIG. 1B1 is merely one example. As shown, a leader node (e.g., see the node of clusterA) interfaces to an application programming interface (e.g., witness API $106_A$). In addition, a follower node (e.g., see the node of clusterC) is interfaced to an application programming interface (e.g., witness API $106_B$). A global witness process 110 runs in a compare-and-swap server 108. The embodiment of FIG. 1B1 is merely an illustrative embodiment where the leader, any number of followers and the compare-and-swap server are each in separate failure domains, however, the global witness process 110 in the compare-and-swap server 108 can run on any node in any cluster.

The embodiment shown in FIG. 1B2 depicts, a receiver-transmitter embodiment of an agent 104 that is interfaced to an application programming interface (e.g., witness API $106_A$). In addition, a listener $118_B$ is interfaced to an application programming interface (e.g., witness API $106_B$). Additional clusters (e.g., cluster, clusterD, etc.) can each support nodes with additional listeners.

In certain deployments, a particular process image (e.g., binary image) is constructed (e.g., by a developer) such that the functions of a transmitter (e.g., a block change transmitter agent) as well as the functions of a receiver (e.g., a disaster recovery change listener) are included in the same image. The particular parameters that pertain to the setting (e.g., in a branch deployment or in a remote office deployment) and/or the particular parameters that pertain to respective roles of leader or follower are determined at run-time based, for example, on conditions and/or parameter that are present and/or determined at the time of invocation. A particular process image can be deployed as a task or process or thread, or a virtual machine (VM) or as a container. Further, the topology of nodes or clusters as interconnected by a network can include spoke-and-wheel topologies, mesh topologies, ring topologies, etc.

Certain aspects in some embodiments of the present application are related to material disclosed in U.S. patent application Ser. No. 14/144,520, issued as U.S. Pat. No. 9,286,344 titled, "METHOD AND SYSTEM FOR MAINTAINING CONSISTENCY FOR I/O OPERATIONS ON METADATA DISTRIBUTED AMONGST NODES IN A RING STRUCTURE" filed on Dec. 30, 2013 the content of which is incorporated by reference in its entirety in this Application.[RB1]

As heretofore discussed, a particular process image (e.g., binary image) is constructed (e.g., by a developer) such that the functions of a transmitter as well as the functions of a receiver are included in the same image. One method for run-time determination of a role (e.g., transmitter or receiver) and relationship (e.g., leader or follower) and is given infra.

The elected leader and any number of followers process continuously, until such time as a leader process is deemed to have crashed or is otherwise unreachable. As earlier described, any of the aforementioned processes can access a global witness process 110 that consults a relationship database 113. Such a relationship database consultation can be performed on a compare-and-swap server 108 that resides in a failure domain separate from the shown clusterA. A relationship database stores one or more state values, which can be used to determine and/or establish a relationship (e.g., leader, follower, owner, etc.) of a process.

Any of a variety of information that is passed to and from the global witness process can be stored in a relationship storage area. One possible organization of computing infrastructure includes a relationship storage area and logic needed for leadership election using a centralized witness process in a multi-processing computing environment, such as in a remote office, branch office environment (ROBO) scenario.

FIG. 1C depicts a remote office, branch office environment having a leader on one cluster (e.g., at a headquarters site 102) and multiple followers on other cluster (e.g., in remote sites offices 116). As an option, one or more variations of ROBO environment 1C00 or any aspect thereof may be implemented in the context of the architecture and functionality of the embodiments described herein. In addition, the ROBO environment 1C00 or any aspect thereof may be implemented in any environment.

The embodiment shown in FIG. 1C is merely one example. As shown, a computing platform (e.g., the shown clusterA) serves as a headquarters site deployment. Computing resources for one or more remote offices are deployed on additional clusters (e.g., clusterB, clusterC, and clusterD). Communication between the headquarters site 102 (e.g., that hosts a leader process) to any of the remote site offices 116 (e.g., see clusterB, clusterC, and clusterD) is facilitated by network services provided in or by the shown cloud 114.

When a leader process is deemed to have crashed (see FIG. 2B) or is otherwise unreachable, any of the aforementioned processes can access a global witness process that resides in a failure domain separate from the ROBO failure group. Continuing this example, such a global witness process can be implemented on a separate server (e.g., compare-and-swap server 108) that resides in a failure domain separate from the ROBO failure group. Such a separate server can host a global witness process 110. In a disaster recovery scenario, a primary process (e.g., disaster recovery change transmitter) might be teamed-up with other processes that are configured as s disaster recovery change receivers. Any of the aforementioned processes from any cluster can offer to become a leader should the formerly designated leader process be deemed to have crashed. In some cases, computing infrastructure at the headquarters site includes multiple nodes, any of which can host a leader process should it be so elected after consulting with the global witness process.

Several approaches to implement hosting a global witness process 110 are considered herein. In one approach, the global witness process is configured as an "active witness". Such an active witness periodically pings all the sites (e.g., clusters) in a deployment and stores the health information. In another approach the witness and/or ancillary or constituent data structures are updated by the participating sites based on a predetermined compare and swap (CAS) protocol.

This latter approach includes the notion of a local witness function in addition to the aforementioned global witness process. Specifically, a local witness function is implemented as a one-per-site entity that communicates with a global witness process. The local witness functions to pass information to and from the global witness process. A local witness process can be implemented as a standalone process, and/or can be implemented as a thread, and/or can be implemented using an application programming interface.

Certain aspects in some embodiments of the present application are related to material disclosed in U.S. patent application Ser. No. 14/610,285 titled, "PULSED LEADER CONSENSUS MANAGEMENT" filed on Jan. 30, 2015, the content of which is incorporated by reference in its entirety in this Application.

Various logic can be implemented in a central location, or can be distributed. The following FIG. 2A presents merely one partitioning possibility for logic flows used to implement leadership election.

FIG. 2A presents a leadership determination flowchart 2A00 to implement leadership election using a centralized witness process in a multi-processing computing environment. As an option, one or more variations of leadership determination flowchart 2A00 or any aspect thereof may be implemented in the context of the architecture and functionality of the embodiments described herein. In addition, the leadership determination flowchart 2A00 or any aspect thereof may be implemented in any environment.

The flow shown in FIG. 2A commences contemporaneously with the start-up invocation of a leader/follower image (see step 202). The process (or thread) checks with the global witness process (see step 204) and receives a response from the global witness process. As shown, decision 206 has two branches based on a test "AM I THE LEADER". A "YES" result causes the image to take on the role of a leader (see step 208). A "NO" result causes the image to determine who is the leader (see step 209), and to take on the role of a follower (see step 210). In this and certain other embodiments, once the determination of leader/follower has been made, that role is the role assumed persistently until the process detects some occurrence that indicates the global witness process is to be again consulted. Such an occurrence can be a failure event 212, or can be as a result of a liveness measure. During processing of the flow of FIG. 2A, up to and including the "NO" branch of decision 206, the global witness process will return an indication of which process is the leader process.

FIG. 2B presents a liveness determination flowchart 2B00 to implement leadership election using a centralized witness process in a multi-processing computing environment. As an option, one or more variations of liveness determination flowchart 2B00 or any aspect thereof may be implemented in the context of the architecture and functionality of the embodiments described herein. In addition, the liveness determination flowchart 2B00 or any aspect thereof may be implemented in any environment.

Liveness determination operates as follows:
The leader sends out a periodic liveness signal to be received by all followers.
The followers check periodically for liveness of the leader. A check, such as for a heartbeat, is executed (see step 216) and the result(s) of the check are compared against some liveness measure 218. A liveness measure check can refer to a constant time period check since the last detected heartbeat that was sent by the then-current leader. Or a liveness measure can include a check against a variable time period check (e.g., see variable timestamp liveness test 222), where variation in the duration of the time period check can be dependent on various conditions such as geographic location, system load, local node time (e.g., 12 PM CST), remote node time (e.g., 9 AM GMT), and/or other measurements.
Determine if the value of the liveness measure is within a predetermined or calculated bound and/or if the value of the liveness measure check meets a threshold test (see decision 220).
When the "YES" branch is taken, the witness is consulted to check (see decision 221) if the witness agrees that the leader is dead. If not, the loop 217 is taken (e.g., to check again later).
When the "NO" branch of decision 221 is taken, the subject process (e.g., the leader process that was checked in step 216) is deemed to be alive, and a check for liveness is performed again (see loop 217) after a delay (see step 214).
When the "YES" branch of decision 221 is taken, the leader is deemed to be dead or otherwise incapable of performing the role of the leader. Moreover, when the "YES" branch of decision 221 is taken, next steps serve to initiate formation of an offer to take on the role of a leader (see step 226). The global witness process is presented (see path 219) with the offer.

By following all or parts of the flow, multiple nodes in various computing clusters that are connected over a network to the global witness process can determine if a resource owner is alive. In exemplary embodiments, resources are exposed so as to be accessed by the multiple nodes. A first node contacts the global witness process to establish ownership of the resource. A second node of the multiple nodes may deem that the it is unable to contact the first node, and may then seek a witness determination that the first node is indeed down (e.g., by contacting the global witness process to get a second opinion that that the first node is not operational). The others of the multiple nodes may also contact the global witness process (e.g., to get a second opinion that that the first node is not operational). One of the multiple nodes will be successful in establishing new ownership of the resource (e.g., since the former owner cannot be contacted and is deemed to be down). The others of the multiple nodes will not be successful in establishing new ownership, so there will be only one owner. A resource can be a role, such as a leadership role. In such situations, one of the multiple nodes will be successful in establishing a new leadership role (e.g., since the former owner cannot be contacted and is deemed to be down). The others of the multiple nodes will not be successful in establishing new leadership role, and may take on the role of a follower.

A relationship storage area is maintained such that a leader assignment can be determined, and can be reassigned (e.g., to a replacement leader) by any process in the ecosystem. A leadership role can be established at any level of granularity over any entity or resource. For example, a leader can be established to oversee a particular job running on a particular VM on a particular node in a particular cluster. Entities and relationships thereto can be stored in a relationship storage area (e.g., a widely-accessible relationship storage area). One example of a relationship storage area is given in FIG. 3.

Figure 3:
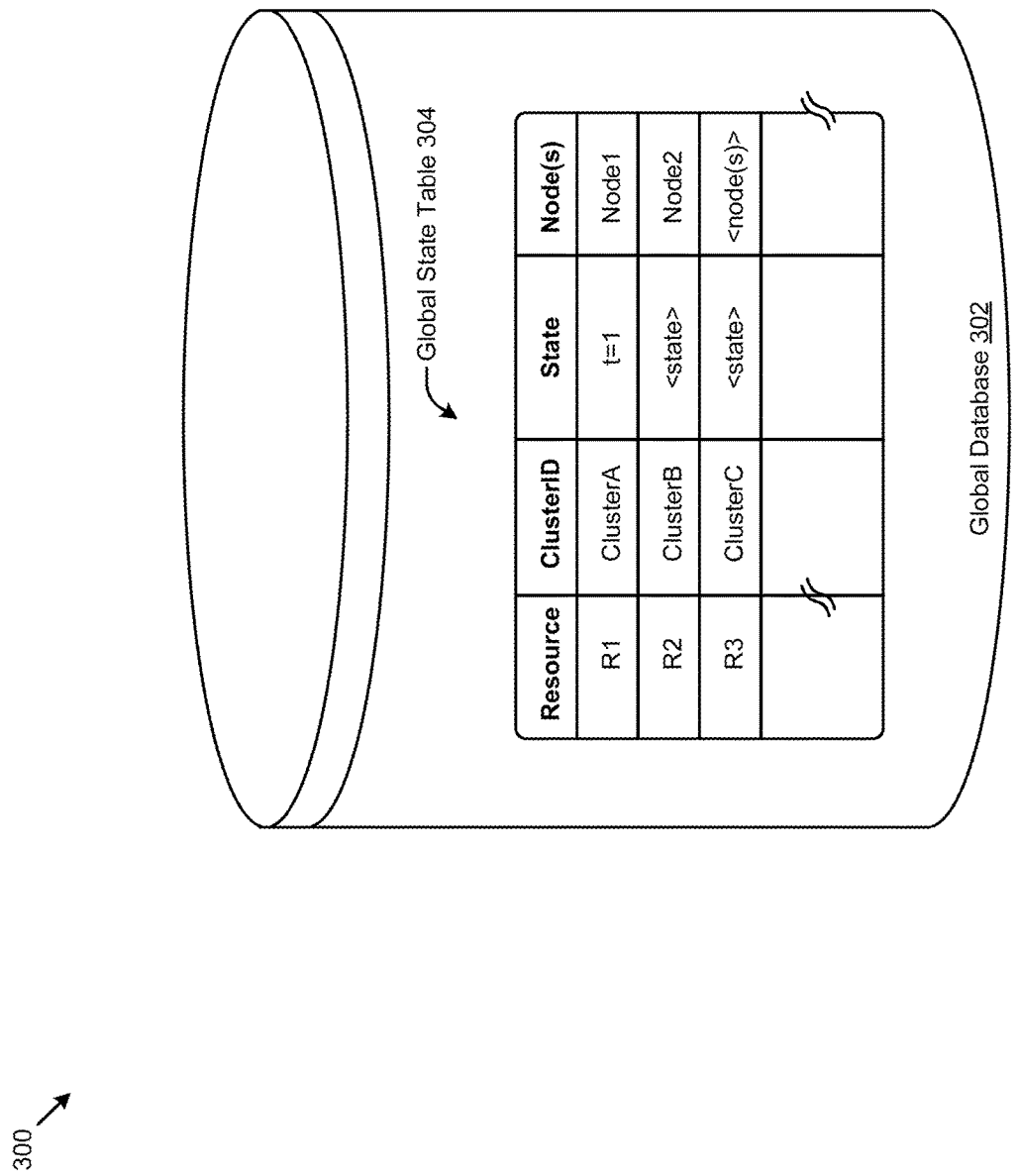
FIG. 3 depicts a relationship storage area as used to implement leadership election using a centralized witness process in a multi-processing computing environment, according to an embodiment.

FIG. 3 depicts a relationship storage area 300 as used to implement leadership election using a centralized witness process in a multi-processing computing environment. As an option, one or more variations of relationship storage area 300 or any aspect thereof may be implemented in the context of the architecture and functionality of the embodiments described herein. In addition, the relationship storage area 300 or any aspect thereof may be implemented in any environment.

The embodiment shown in FIG. 3 is merely one example. The relationship storage area 300 can take the form of a global file and/or a memory structure (e.g., a cache of a global file) and/or can take the form of a global database 302, which in turn may comprise a global state table 304.

A global state table can comprise columns having entries for any domain or granularity. As shown, a global state table 304 might include domains at a relatively low levels of granularity (e.g., at the level of resources) and/or can include domains at relatively higher levels of granularity (e.g., cluster level). Such a table can have columns having additional entries for identification (e.g., entries for a set of nodes). One column in each row holds a state value. The state value is managed by the aforementioned compare-and-swap operations.

The clusterID can take the form of a unique identifier to refer to a respective cluster. The set of nodes can be a list of one or more identifiers to refer to a processing entity in a cluster. The identifier referring to a processing entity need not be unique, so long as the combination of the clusterID and any identifier referring to a processing entity is a unique combination. The state value can be a monotonically increasing number (e.g., a logical timestamp). The state value can be initialized to some initial value that is different from any of the monotonically increasing numbers that might be stored in this column.

Following this embodiment, an update to the relationship storage area succeeds in the case of a TRUE condition for any the following tests:
There is no entry already stored for the {clusterID, processing entity ID} combination.

The stored state value for the accessed row (e.g., with row access key={clusterID, processing entity ID}) has a value that is lesser than a newly passed-in state value.

The stored entry is completely identical to the newly passed-in entry.

The global witness service is granted exclusive write access to the relationship database. Any one or more processes running on any one or more clusters can send a request (e.g., an offer to assume leadership) to the global witness service. Leadership offers and any other sorts of commands or requests are serialized, such as is shown in FIG. 4.

Figure 4:
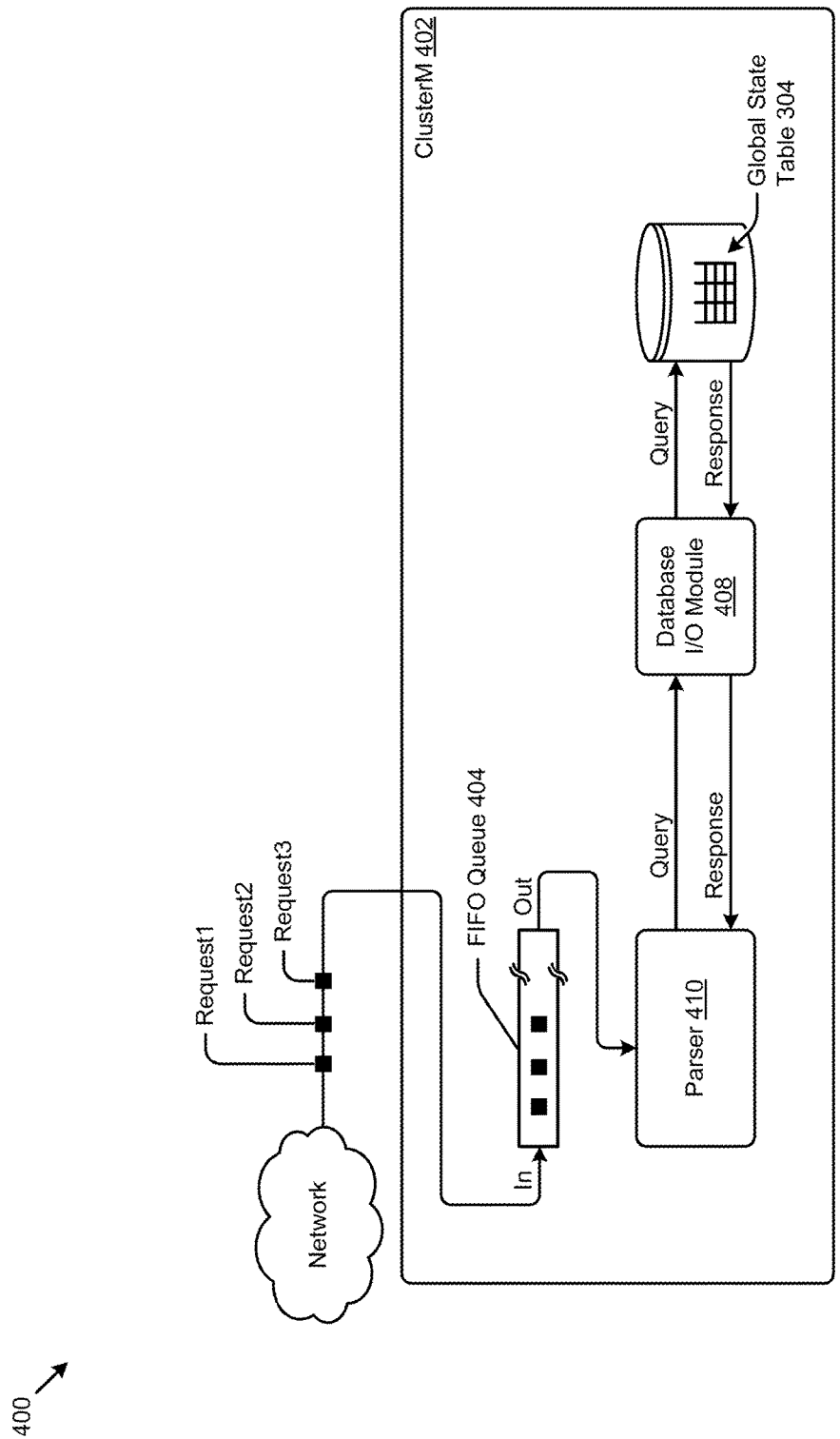
FIG. 4 exemplifies a leadership offer serialization technique as used to implement leadership election using a centralized witness process in a multi-processing computing environment, according to some embodiments.

FIG. 4 exemplifies a leadership offer serialization technique 400 as used to implement leadership election using a centralized witness process in a multi-processing computing environment. As an option, one or more variations of leadership offer serialization technique 400 or any aspect thereof may be implemented in the context of the architecture and functionality of the embodiments described herein. In addition, the leadership offer serialization technique 400 or any aspect thereof may be implemented in any environment.

The shown clusterM 402 is a cluster that defines, or is in a failure domain separate from, the leader process failure domain. ClusterM receives leadership offers and any other sorts of commands or requests (e.g., requests1, request2, request3, etc.) over a network. The requests are queued into a first-in-first-out (FIFO) facility (e.g., FIFO queue 404) before being passed to a database operation processor (e.g., database I/O module 408). A request is taken out of the queue and the request is parsed (see parser 410). A database query or other sort of access to the relationship storage area is made, possibly using a database I/O (input/output or IO) module. In this embodiment, the global state table 304 is accessed and, in some cases, a state value is changed. Examples of situations where a state value is changed are given in FIG. 6A and FIG. 6B.

Serialization can be performed over any received request, regardless of origin and/or regardless of the nature of the request. In some cases, a request is made as pertaining to a particular job that is being performed in a particular cluster.

Figure 5:
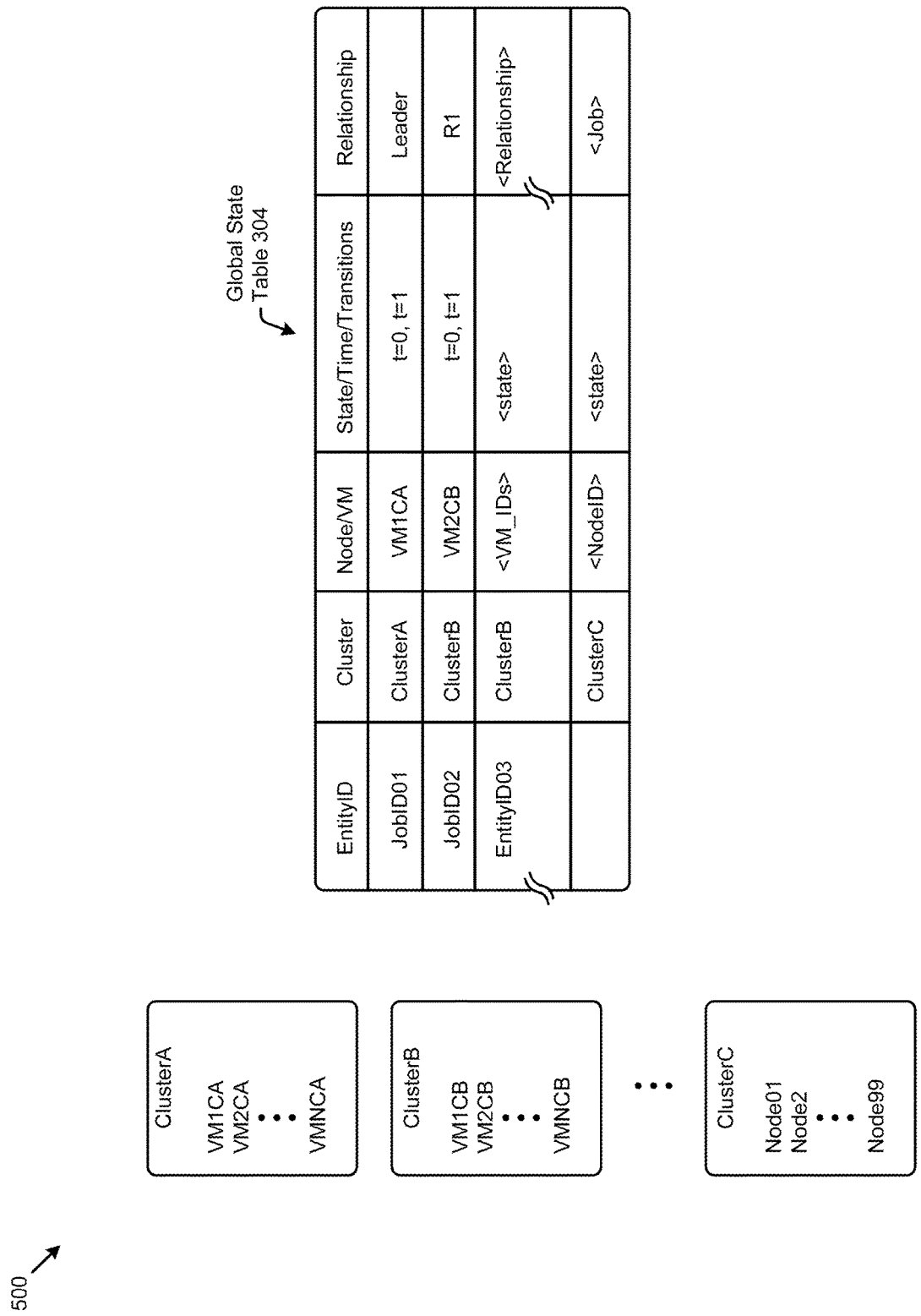
FIG. 5 exemplifies a global state table population technique, according to an embodiment.

FIG. 5 exemplifies a global state table population technique 500 as used to define a failover set of processes. As an option, one or more variations of a global state table population technique 500 or any aspect thereof may be implemented in the context of the architecture and functionality of the embodiments described herein. In addition, a global state table population technique 500 or any aspect thereof may be implemented in any environment.

A global state table can comprise rows that correspond to entities under management. The entities can refer to a particular object (e.g., a file) or a process (e.g., a job or function such a backup or recovery jobs), or a relationship (e.g., leader). The global state table can be initially populated and then managed on an ongoing basis so as to maintain integrity of ownership of a particular entity or leadership among a group of contenders. As shown, a global state table can include data (e.g., columns) that track states and state transitions pertaining to ownership or leadership. In some cases, a time indication can be used as one of several state variables. Any number of tasks or processes or threads can run concurrently and can access the global state table. The global state table can be used in conjunction with a global witness so as to reassign ownership of an entity and/or to re-assign (e.g., re-elect) a leadership relationship.

As earlier indicated, a particular process image can be deployed as a task or process or thread, or a virtual machine (VM) or as a container. FIG. 5 depicts the scenario where several clusters (e.g., clusterA, clusterB, and clusterC) each serve as a host for a plurality of virtual machines (e.g., VM1CA, VM2CA, . . . VMNCA; VM1CB, VM2CB, . . . VMNCB; VM1CC, VM2CC, . . . VMNCC, etc.). Any one from among any group of VMs and/or containers can become a leader. As earlier described, the same process image can be used for both leaders and followers. Further, the same process image can be used for two or more processes that are assigned into a failover set. In such a case, the particular parameters that pertain to the determination of a primary leader role or a standby leader role can be determined at run-time based, for example, on conditions and/or parameter that are present and/or determined at the time of invocation.

As shown in FIG. 5, VM1CA and VM2CA are assigned into a failover set and are invoked (e.g., with primary/standby leadership conditions and/or parameters being present and/or determined at the time of invocation). In this example, both VM1CA and VM2CA are assigned to job="J1". At time t=0, each of the processes VM1CA and VM2CA communicates (e.g., with an ownership request or leadership offer) to the global witness process. The global witness process in turn makes an initial entry into the global state table 304. In this example, the virtual machine VM2CA happens to issue the leadership offer that is processed first. Accordingly, VM2CA's entry (as shown) indicates establishment of leadership at time t=1.

As earlier indicated, each node in a deployment that offers to become a leader uses the same application programming interface to query the service. The herein-disclosed global witness service will pick exactly one of the offerors in the cluster to become a leader. In this example, the virtual machine VM2CA takes on the leader role (see entry "t=1") for processing job="J1".

Loss of Leader

It can happen that a failure event occurs (see FIG. 2A), and upon such an event or shortly thereafter other processes detect the loss of a heartbeat, and deem that as a loss of a leader. Operations that depict actions taken for accessing a shared resource or for determining a new leader after losing a leader are presented in FIG. 6A and FIG. 6B.

Figure 6A:
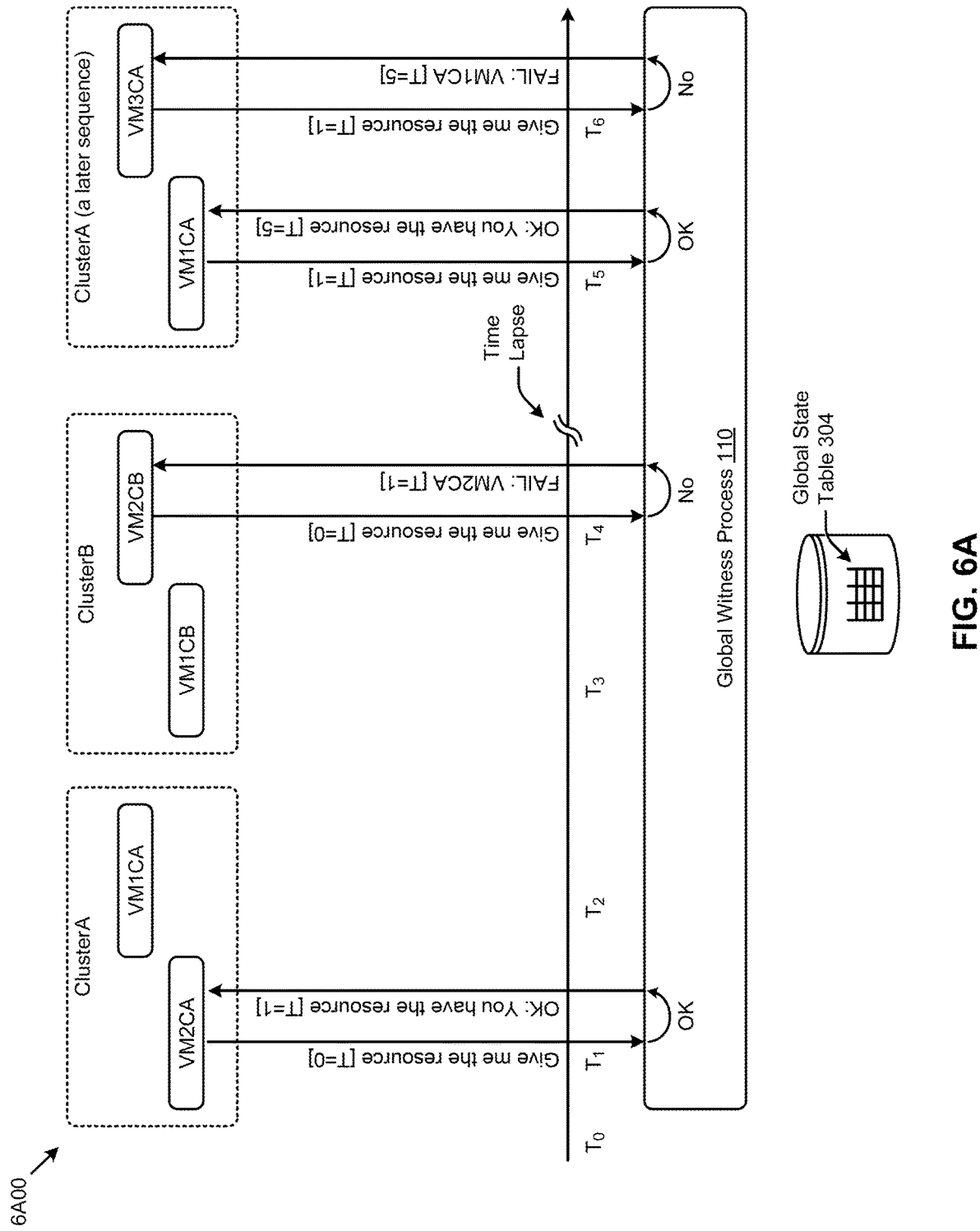
FIG. 6A exemplifies a set of witness process operations as used to implement resource ownership using a centralized witness process in a multi-processing computing environment, according to some embodiments.

FIG. 6A exemplifies a set of witness process operations 6A00 as used to implement resource ownership using a centralized witness process in a multi-processing computing environment. As an option, one or more variations of witness process operations 6A00 or any aspect thereof may be implemented in the context of the architecture and functionality of the embodiments described herein. In addition, the witness process operations 6A00 or any aspect thereof may be implemented in any environment.

The embodiment shown in FIG. 6A depicts interactions between several virtual machines distributed across several clusters. The serialization or requests, combined with the CAS properties being enforced over operations, results in establishment of exactly one resource owner at a time.

Referring to the timeline of FIG. 6A, the shown interactions occur during the timeframe t=1 through t=6. At time t=1 and time t=4, both of the virtual machines VM2CA and VM2CB make a request for access to a particular resource. It can happen that the request originating from virtual machine VM2CA is processed first (see "Give me the resource [T=0]" at time $T_1$) by the global witness process. The global witness process responds with an affirmative acknowledgement (e.g., see "OK: You have the resource

[T=1]" at time T$_1$). Note that the acknowledgement response includes a monotonically increasing number. In this example, the monotonically increasing number is a logical timestamp. VM2CA's request is accepted and recorded, and VM2CA processes the acknowledgement response to save the logical timestamp as returned by the global witness process. Contemporaneously, the virtual machine VM2CB has issued an ownership request, however VM2CA's request was processed first. The global witness process returns a negative acknowledgement to VM2CB (e.g., see "FAIL: VM2CA [T=1]").

As can be understood from the foregoing, virtual machines, including virtual machines that are running in different clusters that issue the later-processed resource ownership requests, all receive negative acknowledgements along with identification of the owner and the logical timestamp as of the "OK" acknowledgement that was sent to the owning process. This regime works as well even when the two or more requestors over a particular resource are running in the same cluster (e.g., see the example shown at T$_5$ and T$_6$).

Figure 6B:
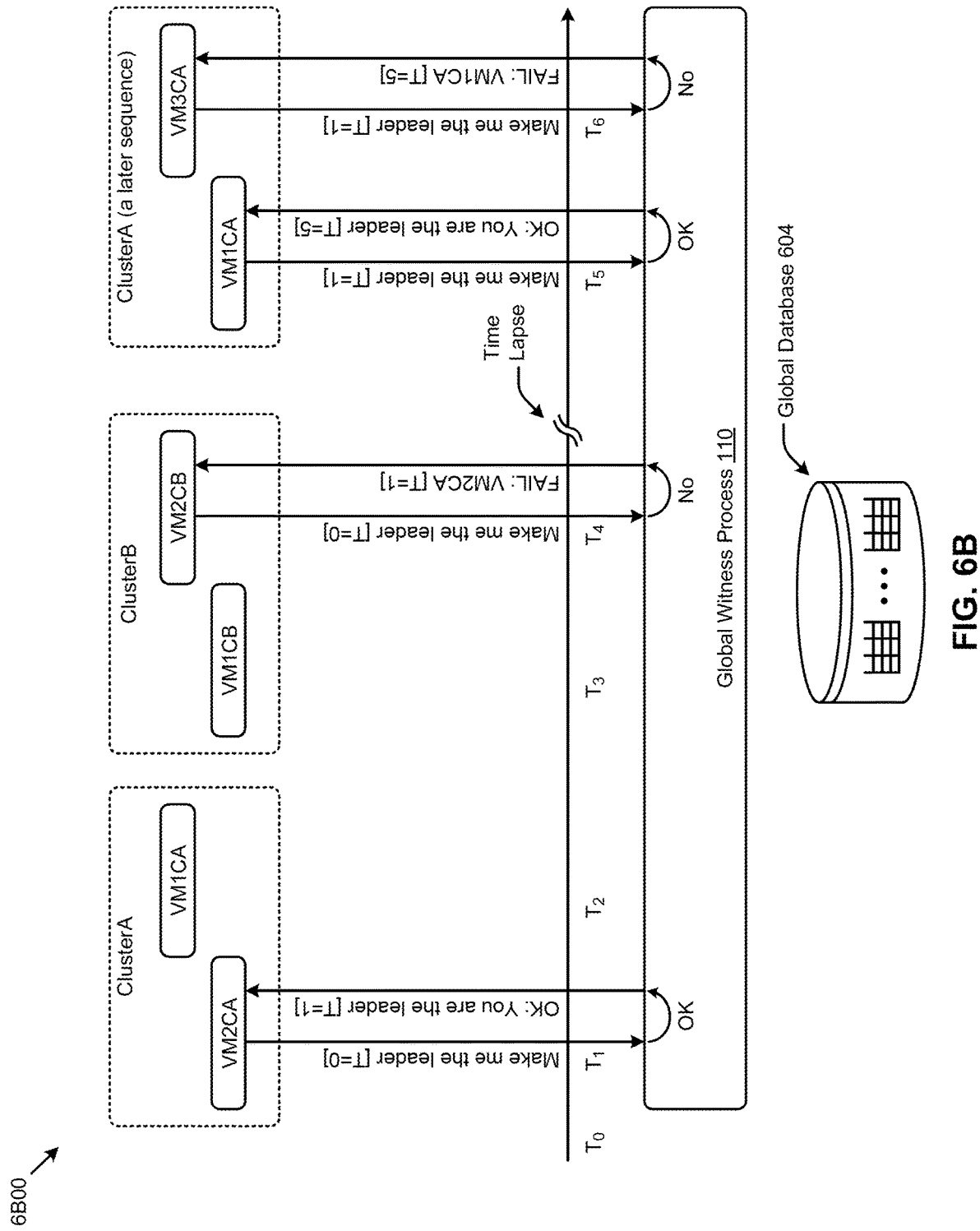
FIG. 6B exemplifies a set of witness process operations as used to implement leadership election using a centralized witness process in a multi-processing computing environment, according to some embodiments.

FIG. 6B exemplifies a set of witness process operations 6B00 as used to implement leadership election using a centralized witness process in a multi-processing computing environment. As an option, one or more variations of witness process operations 6B00 or any aspect thereof may be implemented in the context of the architecture and functionality of the embodiments described herein. In addition, the witness process operations 6B00 or any aspect thereof may be implemented in any environment.

The embodiment shown in FIG. 6B depicts interactions between several virtual machines distributed across several clusters. The serialization or requests, combined with the CAS properties being enforced over operations, results in establishment of exactly one leader at a time.

Referring to the timeline of FIG. 6B, the shown interactions occur during the timeframe t=1 through t=6. At time t=1, both of the virtual machines VM2CA and VM2CB make an offer to lead. It happens that the offer originating from virtual machine VM2CA is processed first by the global witness process (see "Make me the leader [T=0]" at time T$_1$). The global witness process responds with an affirmative acknowledgement (e.g., see "OK: You are the leader [T=1]" at time T$_1$). Note that the acknowledgement response includes a monotonically increasing number; in this example, the monotonically increasing number is a logical timestamp. VM2CA's leadership request is accepted and recorded, and VM2CA processes the acknowledgement response to save the logical timestamp as returned by the global witness process. Contemporaneously, the virtual machine VM2CB has issued an offer to lead, however VM2CA's offer to lead was processed and granted first. The global witness process returns a negative acknowledgement to VM2CB (e.g., see "FAIL: VM2CA [T=1]"). As can be understood from the foregoing, the virtual machines corresponding to the later-processed leadership offers all received negative acknowledgements, along with identification of the leader and the logical timestamp of the leadership grant.

The foregoing is an example of operation of the global witness service. Specifically, upon receiving a leadership offer from a node, global witness service will attempt to write a particularly-formed key/value pair using a compare-and-swap operation. If the particular compare-and-swap operation (e.g., using the particularly-formed key/value pair) succeeds, then the offeror becomes the leader. Otherwise, the global witness service deems that a leader has already been selected, and the offeror is so advised. In the example of FIG. 6B, the particularly-formed key/value pair is formed from the combination of the clusterID (e.g., "clusterA") and the virtual machine identification (e.g., "VM2CA"). Using this particularly-formed key/value pair, a single leader can be accepted for each cluster. A different cluster might host other processes, threads or VMs that contend for leadership when forming leader/follower relationships. A global database 604 comprising one or more state tables to hold a plurality of state values can be used to manage exclusivity to resources and/or exclusive leadership based on any one or more of the state values. In some cases, a global database 604 comprising a plurality of state values can be sharded to multiple storage locations. The sharding distribution can be based on the nature or characteristics of a state.

Merely as additional examples:

The VMs in the shown "clusterB" (see VM1CB and VM2CB) contend between themselves for leadership. VM1CB's offer is processed before VM2CB's offer, and accordingly VM1CB becomes the leader in clusterB.

At a later time, various events occur (see time lapse), which events may include loss of leadership (e.g., crash) of the formerly-assigned leader VM2CA. Should this occur, VM1CA would recognize the loss of a heartbeat to VM2CA. VM1CA (as well as other VMs that recognize the loss of a heartbeat to VM2CA would contend for leadership. As shown in the later sequence for clusterA beginning at time T$_5$, VM1CA becomes the leader, and all other VMs that contend for leadership would receive a negative acknowledgement. All of the other VMs that contend for leadership would receive an indication of the elected leader VM1CA and the logical timestamp of the time upon which the elected leader VM1CA became the leader.

Note that at this point in the timeline, even if the formerly-assigned leader VM2CA that was deemed to be "crashed" was restarted, it would receive a negative acknowledgement from the global witness process 110, since VM1CA had requested and received leadership.

Figure 7:
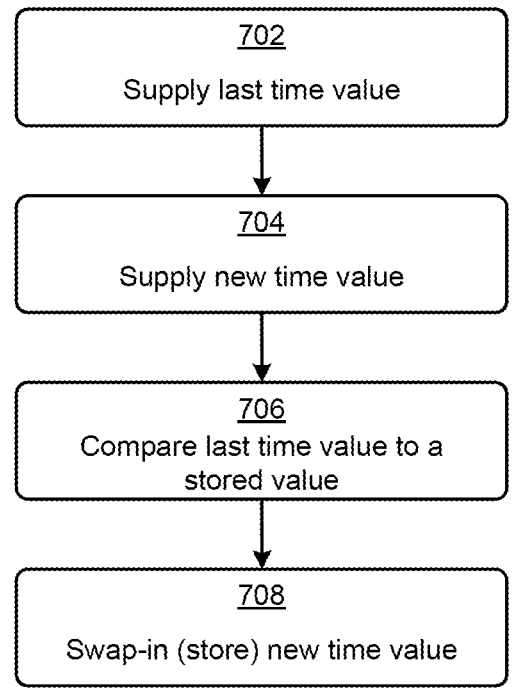
FIG. 7 exemplifies a compare-and-swap (CAS) flow as used to implement leadership election using a centralized witness process in a multi-processing computing environment, according to an embodiment.

FIG. 7 exemplifies a compare-and-swap (CAS) flow 700 as used to implement leadership election using a centralized witness process in a multi-processing computing environment. As an option, one or more variations of CAS flow 700 or any aspect thereof may be implemented in the context of the architecture and functionality of the embodiments described herein. In addition, the CAS flow 700 or any aspect thereof may be implemented in any environment.

In this embodiment, a centralized witness process processes in accordance with the CAS flow 700. Specifically, the centralized witness process receives a "last time value" (e.g., "[T=1]") taken from a leadership offer (see step 702). The centralized witness process checks the current time and forms a logical timestamp (see step 704). The last time value is compared (e.g., see step 706) to a stored value (e.g., the stored value in the global state table) to determine if the offer is to be accepted (e.g., with a positive acknowledgement) or denied (e.g., with a FAIL negative acknowledgement). In cases when the offer is accepted, then the new time value is swapped-in to the stored location (see step 708). In some situations, techniques other than compare-and-swap can be used to police consistency pertaining to rights and/or accesses, and/or to facilitate leadership election. For example, locks or semaphores can be used.

Figure 8:
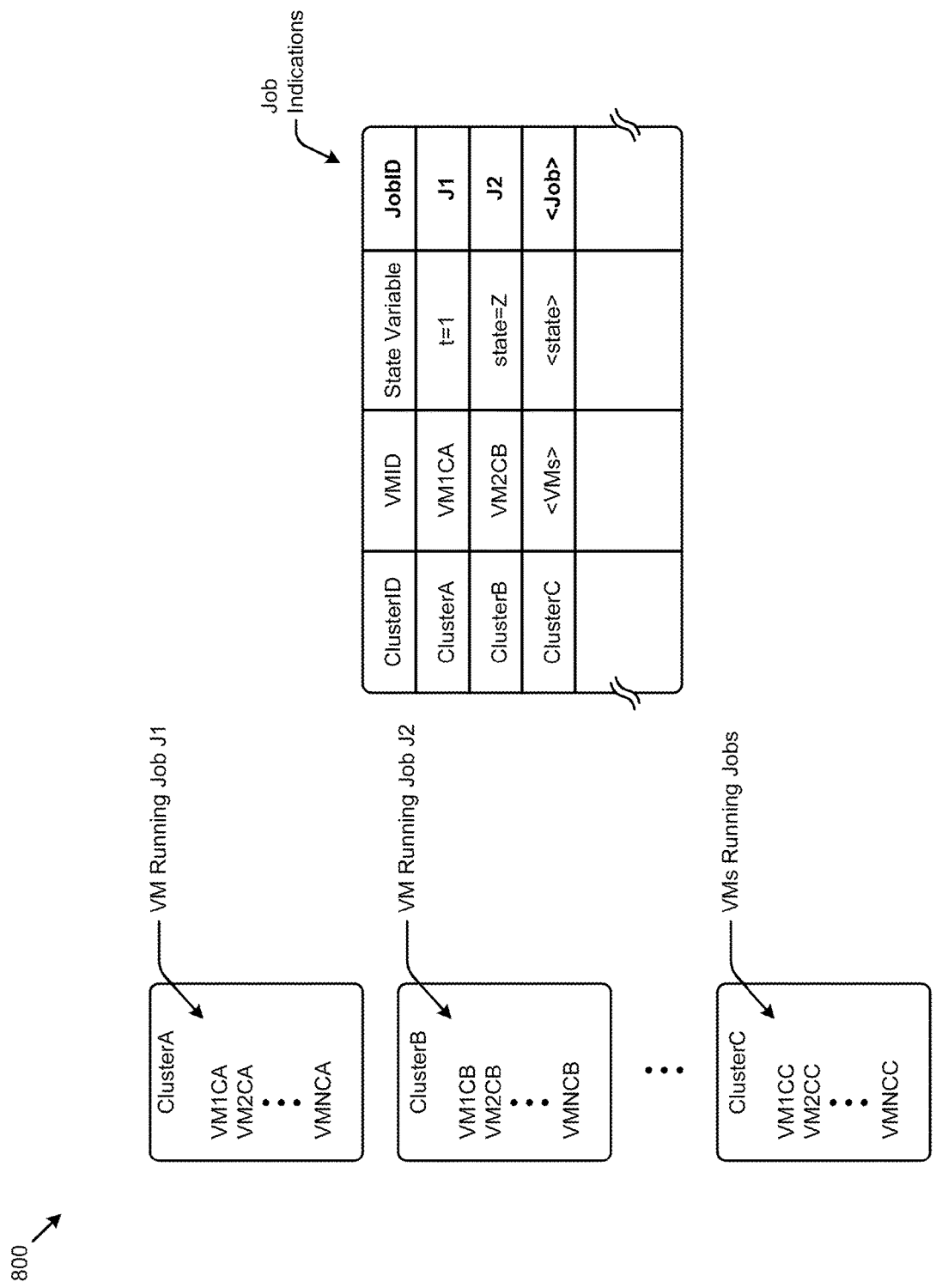
FIG. 8 exemplifies a job field management technique for scalable leadership election using a centralized witness process in a multi-processing computing environment, according to an embodiment.

FIG. 8 exemplifies a job field management technique 800 for scalable leadership election using a centralized witness process in a multi-processing computing environment. As an option, one or more variations of job field management technique 800 or any aspect thereof may be implemented in the context of the architecture and functionality of the embodiments described herein. In addition, the job field management technique 800 or any aspect thereof may be implemented in any environment.

The embodiment shown in FIG. 8 is merely one example of using a global state table that can be used in a key lookup and other job field management operations. In this case, the job column includes a job indication "J1" for VM1CA and includes a job indication "J2" for VM2CB. A job ID is merely one example of using a particularly-formed key/value pair. A single leader or owner can be accepted for the domain referred to by the key. For example, the domain can be formed from just the cluster identification (e.g., to provide just one leader per clusterID, irrespective of a job assignment), or can be formed from just the job indication (e.g., to provide just one leader per job, irrespective of the cluster assignment). Any state variable can be used in conjunction with any particularly-formed key/value pair in any domain.

Additional Embodiments of the Disclosure

Additional Practical Application Examples

Figure 9:
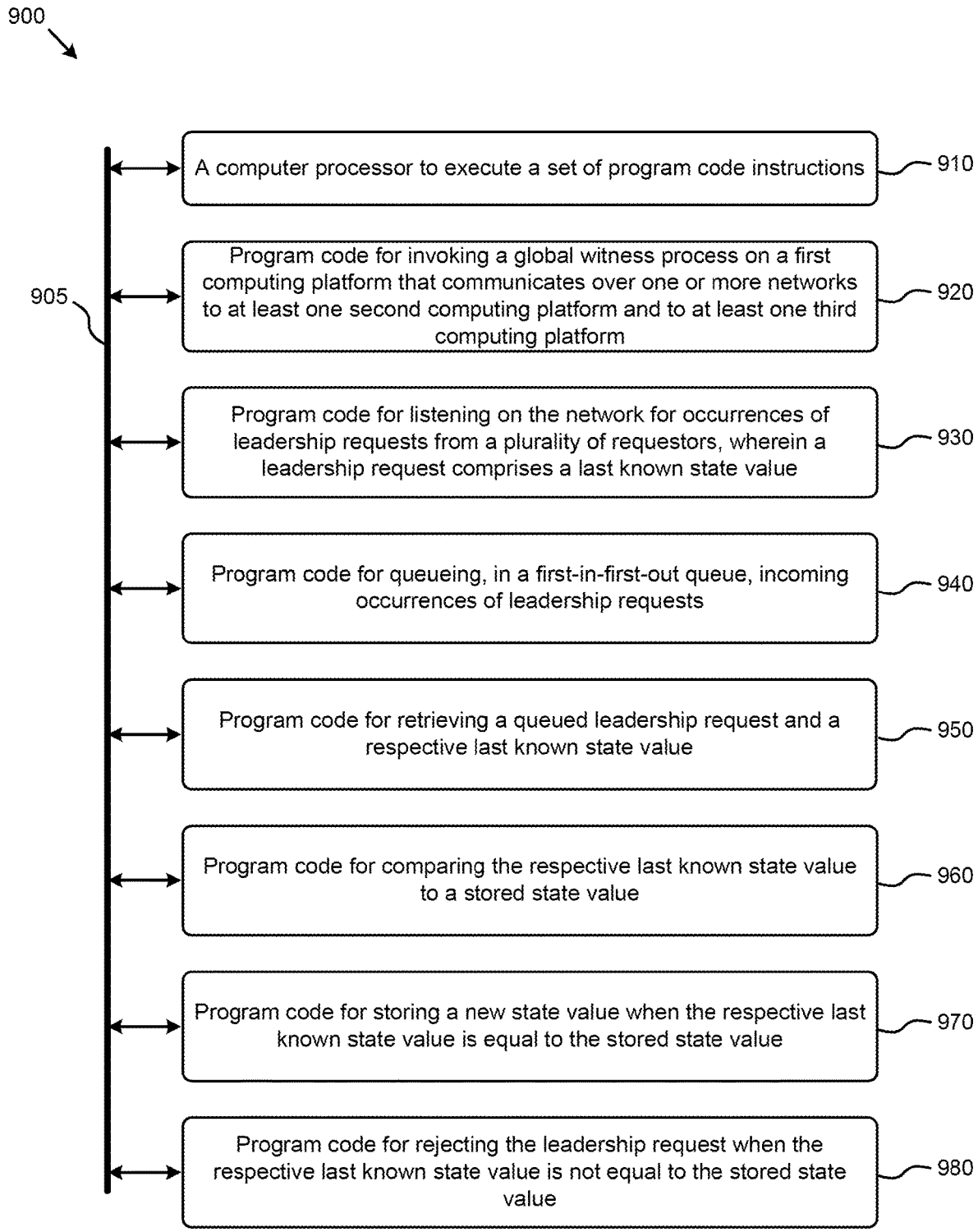
FIG. 9 depicts a system components as arrangements of computing modules that are interconnected so as to implement certain of the herein-disclosed embodiments.

FIG. 9 depicts a system 900 as an arrangement of computing modules that are interconnected so as to operate cooperatively to implement certain of the herein-disclosed embodiments. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising a computer processor to execute a set of program code instructions (see module 910) and modules for accessing memory to hold program code instructions to perform: invoking a global witness process on a first computing platform that communicates over one or more networks to at least one second computing platform and to at least one third computing platform (see module 920); listening on the network for occurrences of leadership requests from a plurality of requestors, wherein a leadership request comprises a last known state value (see module 930); queueing, in a first-in-first-out queue, incoming occurrences of leadership requests (see module 940); retrieving a queued leadership request and a respective last known state value (see module 950); comparing the respective last known state value to a stored state value (see module 960); storing a new state value when the respective last known state value is equal to the stored state value (see module 970); and rejecting the leadership request when the respective last known state value is not equal to the stored state value (see module 980).

Many embodiments or variations are possible, some of which embodiments or variations are given below:

Embodiments that further comprise sending the new state value to at least some of the requestors.

Embodiments that further comprise sending an affirmative acknowledgement to one of the requestors to generate a single leader, and sending a negative acknowledgement to the remaining requestors to generate a set of followers.

Embodiments wherein the single leader is a disaster recovery change transmitter.

Embodiments wherein at least one of the set of followers is a disaster recovery change listener.

Embodiments that further comprise sending a periodic liveness signal by the single leader.

Embodiments wherein at least some of the followers perform a liveness measure check.

Embodiments wherein comparing the respective last known state value to a stored state value retrieves the stored state value from a global database.

Embodiments wherein the global database comprises a global state table.

Embodiments wherein the first-in-first-out queue is a queueing facility to access the global database.

System Architecture Overview

Additional System Architecture Examples

Figure 10A:
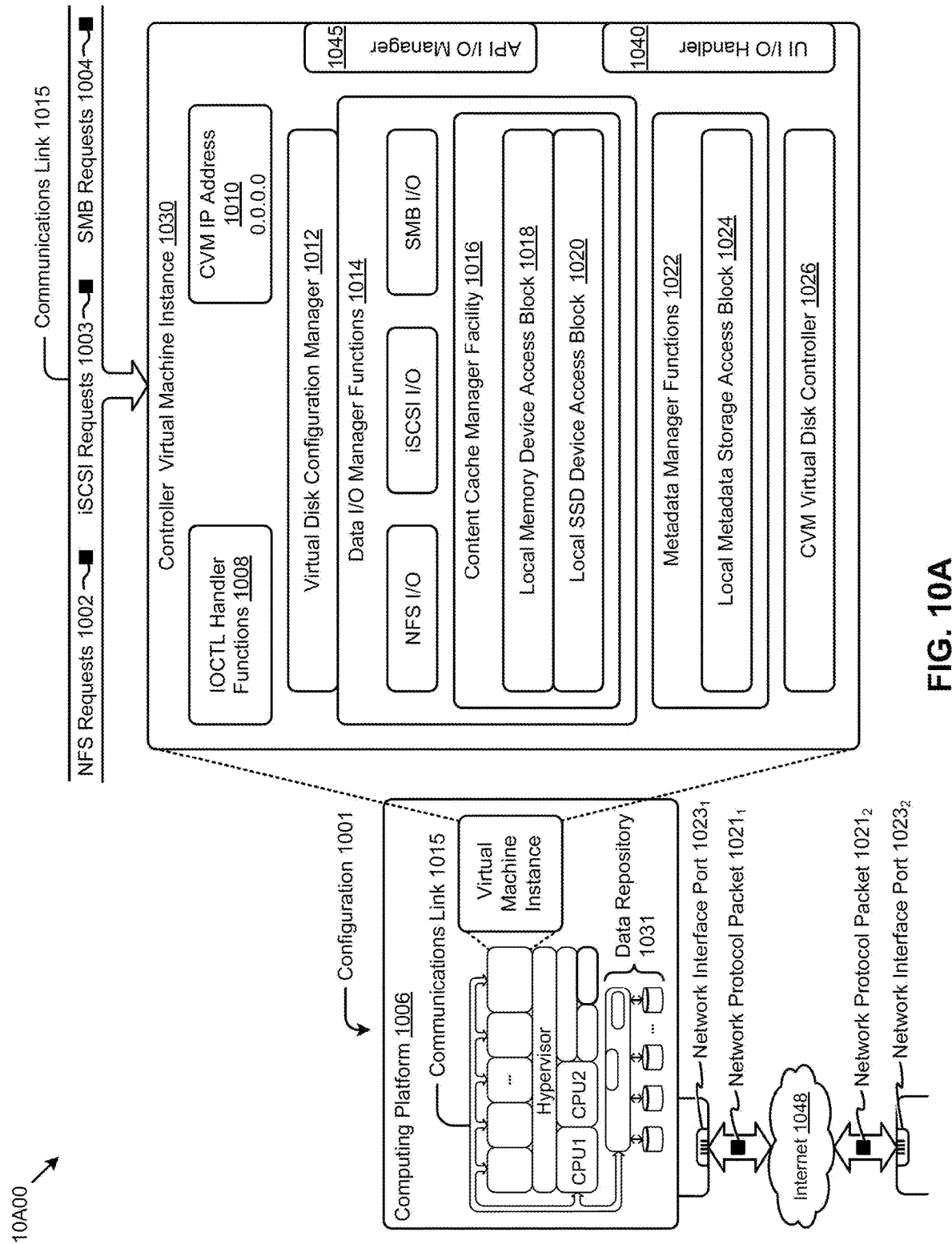
FIG. 10A and FIG. 10B depict architectures comprising collections of interconnected components suitable for implementing embodiments of the present disclosure and/or for use in the herein-described environments.

FIG. 10A depicts a virtual machine architecture 10A00 comprising a collection of interconnected components suitable for implementing embodiments of the present disclosure and/or for use in the herein-described environments. The shown virtual machine architecture 10A00 includes a virtual machine instance in a configuration 1001 that is further described as pertaining to the controller virtual machine instance 1030. A controller virtual machine instance receives block I/O (input/output or IO) storage requests as network file system (NFS) requests in the form of NFS requests 1002, and/or internet small computer storage interface (iSCSI) block IO requests in the form of iSCSI requests 1003, and/or Samba file system requests (SMB) in the form of SMB requests 1004. The controller virtual machine instance publishes and responds to an internet protocol (IP) address (e.g., see CVM IP address 1010. Various forms of input and output (I/O or IO) can be handled by one or more IO control handler functions (see IOCTL functions 1008) that interface to other functions such as data IO manager functions 1014, and/or metadata manager functions 1022. As shown, the data IO manager functions can include communication with a virtual disk configuration manager 1012, and/or can include direct or indirect communication with any of various block IO functions (e.g., NFS IO, iSCSI IO, SMB IO, etc.).

In addition to block IO functions, the configuration 1001 supports IO of any form (e.g., block IO, streaming IO, packet-based IO, HTTP traffic, etc.) through either or both of a user interface (UI) handler such as UI IO handler 1040 and/or through any of a range of application programming interfaces (APIs), possibly through the shown API IO manager 1045.

The communications link 1015 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid-state storage devices (SSD), or optical or magnetic disks such as disk drives or tape drives. Volatile media includes dynamic memory such as a random access memory. As shown, the controller virtual machine instance 1030 includes a content cache manager facility 1016 that accesses storage locations, possibly including local DRAM (e.g., through the local memory device access block 1018) and/or possibly including accesses to local solid state storage (e.g., through local SSD device access block 1020).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 1031, which in turn can be formatted into any one or more storage areas, and which can comprise parameterized storage accessible by a key (e.g., a filename, a table name, a block address, an offset address, etc.). An external data repository 1031, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 1024. The external data repository 1031, can be configured using a CVM virtual disk controller 1026, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 1001 can be coupled by a communications link 1015 (e.g., backplane, LAN, PTSN, wired or wireless network, etc.) and each instance may perform respective portions of sequences of instructions as may be required to practice embodiments of the disclosure The shown computing platform 1006 is interconnected to the Internet 1048 through one or more network interface ports (e.g., network interface port $1023_1$ and network interface port $1023_2$). The configuration 1001 can be addressed through one or more network interface ports using an IP address. Any operational element within computing platform 1006 can perform sending and receiving operations using any of a range of network protocols, possibly including network protocols that send and receive packets (e.g., see network protocol packet $1021_1$ and network protocol packet $1021_2$).

The computing platform 1006 may transmit and receive messages that can be composed of configuration data, and/or any other forms of data and/or instructions organized into a data structure (e.g., communications packets). In some cases, the data structure includes program code instructions (e.g., application code), communicated through Internet 1048 and/or through any one or more instances of communications link 1015. Received program code may be processed and/or executed by a CPU as it is received and/or program code may be stored in any volatile or non-volatile storage for later execution. Program code can be transmitted via an upload (e.g., an upload from an access device over the Internet 1048 to computing platform 1006). Further, program code and/or results of executing program code can be delivered to a particular user via a download (e.g., a download from the computing platform 1006 over the Internet 1048 to an access device).

The configuration 1001 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of scalable exclusive resource access using a centralized witness process in a multi-processing computing environment.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of scalable exclusive resource access using a centralized witness process in a multi-processing computing environment). Such files or records can be brought into and/or stored in volatile or non-volatile memory.

Figure 10B:
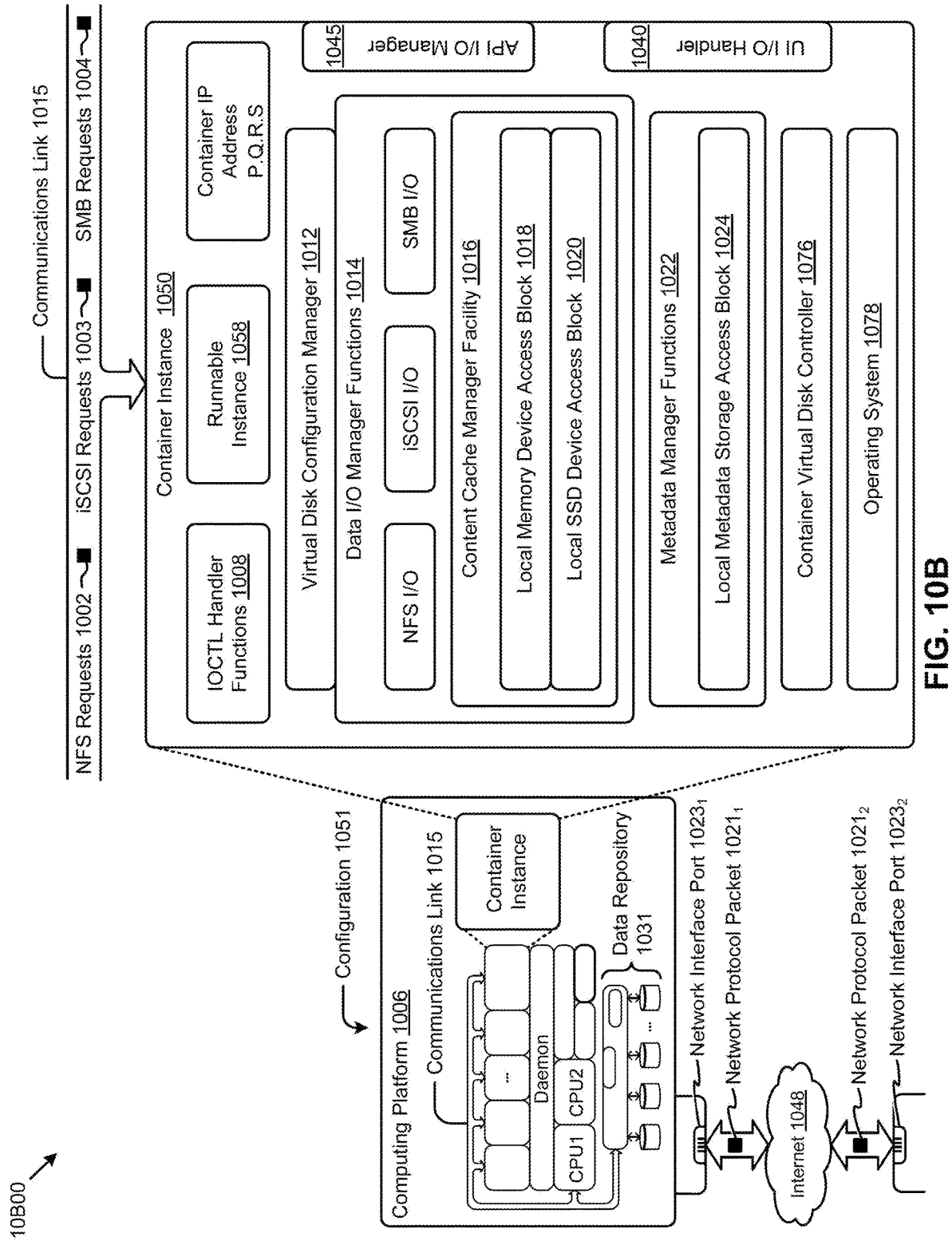

FIG. 10B depicts a containerized architecture 10B00 comprising a collection of interconnected components suitable for implementing embodiments of the present disclosure and/or for use in the herein-described environments. The shown containerized architecture 10B00 includes a container instance in a configuration 1051 that is further described as pertaining to the container instance 1050. The configuration 1051 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system 1078, however such an operating system need not be provided. Instead, a container can include a runnable instance 1058, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 1076. Such a container virtual disk controller can perform any of the functions that the aforementioned CVM virtual disk controller 1026, yet such a container virtual disk controller does not rely on a hypervisor or any particular operating system in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A non-transitory computer readable medium having stored thereon a sequence of instructions which, when executed by a processor performs a set of acts comprising:
receiving, at a witness process on a first node in a first fault domain, a request from a second node in a second fault domain to become an owner of a resource shared across the second fault domain and a third fault domain, wherein a third node in the third fault domain was previously established as the owner of the resource using the witness process and the witness process maintains an ownership state for the resource and the second and third fault domains are at different sites accessible over a network;
determining that the second node in the second fault domain should become the owner of the resource;
transmitting an authorization from the witness process on the first node to the second node granting ownership of the resource to the second node to become a new owner of the resource; and
updating the ownership state for the resource at the witness process on the first node, wherein the new owner of the resource communicates a copy of storage changes to both a fault domain of a follower node and the second fault domain of the second node.

2. The non-transitory computer readable medium of claim 1, wherein the resource to be accessed is a leadership relationship.

3. The non-transitory computer readable medium of claim 1, wherein multiple requestors contact the witness process to establish a leadership relationship.

4. The non-transitory computer readable medium of claim 3, wherein the set of acts further comprise sending an affirmative acknowledgement to one of the multiple requestors to identify a single owner of the resource, and sending a negative acknowledgement to a set of remaining requestors to generate a set of followers.

5. The non-transitory computer readable medium of claim 4, wherein the set of acts further comprise sending a periodic liveness signal by the owner of the resource.

6. The non-transitory computer readable medium of claim 4, wherein at least some of the set of followers perform a liveness measure check.

7. The non-transitory computer readable medium of claim 1, wherein the set of acts further comprise comparing a respective last known state value to a stored state value that is stored in a database.

8. The non-transitory computer readable medium of claim 7, wherein the database comprises a plurality of state tables or a plurality of state values.

9. A method comprising:
receiving, at a witness process on a first node in a first fault domain, a request from a second node in a second fault domain to become an owner of a resource shared across the second fault domain and a third fault domain, wherein a third node in the third fault domain was previously established as the owner of the resource using the witness process and the witness process maintains an ownership state for the resource and the second and third fault domains are at different sites accessible over a network;
determining that the second node in the second fault domain should become the owner of the resource;
transmitting an authorization from the witness process on the first node to the second node granting ownership of the resource to the second node to become a new owner of the resource; and
updating the ownership state for the resource at the witness process on the first node, wherein the new owner of the resource communicates a copy of storage changes to both a fault domain of a follower node and the second fault domain of the second node.

10. The method of claim 9, wherein the resource to be accessed is a leadership relationship.

11. The method of claim 9, wherein multiple requestors contact the witness process to establish a leadership relationship.

12. The method of claim 11, further comprising sending an affirmative acknowledgement to one of the multiple requestors to identify a single owner of the resource, and sending a negative acknowledgement to a set of remaining requestors to generate a set of followers.

13. The method of claim 12, further comprising sending a periodic liveness signal by the owner of the resource.

14. The method of claim 12, wherein at least some of the set of followers perform a liveness measure check.

15. The method of claim 9, further comprising comparing a respective last known state value to a stored state value that is stored in a database.

16. The method of claim 15, wherein the database comprises a plurality of state tables or a plurality of state values.

17. A system comprising:
a non-transitory storage medium having stored thereon a sequence of instructions; and a processor that executes the sequence of instructions to perform a set of acts comprising:

receiving, at a witness process on a first node in a first fault domain, a request from a second node in a second fault domain to become an owner of a resource shared across the second fault domain and a third fault domain, wherein a third node in the third fault domain was previously established as the owner of the resource using the witness process and the witness process maintains an ownership state for the resource and the second and third fault domains are at different sites accessible over a network;

determining that the second node in the second fault domain should become the owner of the resource;

transmitting an authorization from the witness process on the first node to the second node granting ownership of the resource to the second node; and updating the ownership state for the resource at the witness process on the first node;

transmitting an authorization from the witness process on the first node to the second node granting ownership of the resource to the second node to become a new owner of the resource; and updating the ownership state for the resource at the witness process on the first node, wherein the new owner of the resource communicates a copy of storage changes to both a fault domain of a follower node and the second fault domain of the second node.

18. The system of claim 17, wherein the resource to be accessed is a leadership relationship.

19. The system of claim 17, wherein multiple requestors contact the witness process to establish a leadership relationship.

20. The system of claim 19, wherein the set of acts further comprise sending an affirmative acknowledgement to one of the multiple requestors to identify a single owner of the resource, and sending a negative acknowledgement to a set of remaining requestors to generate a set of followers.

21. The system of claim 20, wherein the set of acts further comprise sending a periodic liveness signal by the owner of the resource.

22. The system of claim 20, wherein at least some of the set of followers perform a liveness measure check.

23. The system of claim 17, wherein the set of acts further comprise, comparing a respective last known state value to a stored state value that is stored in a database.

24. The system of claim 23, wherein the database comprises a plurality of state tables or a plurality of state values.

* * * * *